(12) United States Patent
Julien

(10) Patent No.: US 10,899,114 B2
(45) Date of Patent: Jan. 26, 2021

(54) MULTILAYER FILM, METHOD OF MAKING THE SAME AND CONTAINERS FORMED FROM THE SAME

(71) Applicant: MEISSNER FILTRATION PRODUCTS, INC., Camarillo, CA (US)

(72) Inventor: Christian Julien, Camarillo, CA (US)

(73) Assignee: MEISSNER FILTRATION PRODUCTS, INC., Camarillo, CA (US)

( * ) Notice: Subject to any disclaimer, the term of this patent is extended or adjusted under 35 U.S.C. 154(b) by 614 days.

(21) Appl. No.: 15/588,515

(22) Filed: May 5, 2017

(65) Prior Publication Data
US 2017/0239922 A1 Aug. 24, 2017

Related U.S. Application Data

(62) Division of application No. 12/069,187, filed on Feb. 8, 2008, now Pat. No. 9,662,869.
(Continued)

(51) Int. Cl.
 B32B 27/08 (2006.01)
 B32B 7/12 (2006.01)
 (Continued)

(52) U.S. Cl.
 CPC .......... *B32B 27/08* (2013.01); *A61J 1/10* (2013.01); *A61J 1/1468* (2015.05); *A61J 1/1475* (2013.01);
(Continued)

(58) Field of Classification Search
 CPC ... B32B 27/08; B32B 37/153; B32B 37/1284; B32B 1/02; B32B 27/32; B32B 27/306;
(Continued)

(56) References Cited

U.S. PATENT DOCUMENTS 3,931,113 A * 1/1976 Seeger .............. B32B 17/10018
528/83
4,221,757 A * 9/1980 Strassel ................... B29C 48/30
264/173.13
(Continued)

FOREIGN PATENT DOCUMENTS

CN 1147447 A 4/1997
EP 0 699 520 A1 3/1996
(Continued)

OTHER PUBLICATIONS

International Search Report and Written Opinion for International Application No. PCT/US2008/001699, dated Dec. 8, 2008.

*Primary Examiner* — Jeffrey M Wollschlager
(74) *Attorney, Agent, or Firm* — Lewis Roca Rothberger Christie LLP

(57) ABSTRACT

A RF weldable film is provided. The film has outer layer including a PVDF copolymer or an alpha-olefin polymer and backing layer including a TPU copolymer. The film may have a gas barrier layer attached to the backing layer. The backing layer may include an EVOH copolymer. A method of making such a film is also provided. Containers made from such film are further provided.

20 Claims, 8 Drawing Sheets

Related U.S. Application Data

(60) Provisional application No. 60/900,460, filed on Feb. 8, 2007.

(51) Int. Cl.

| | | |
|---|---|---|
| *B32B 27/30* | (2006.01) | |
| *B32B 27/32* | (2006.01) | |
| *B32B 27/40* | (2006.01) | |
| *B29C 48/00* | (2019.01) | |
| *B29C 48/08* | (2019.01) | |
| *B29C 48/22* | (2019.01) | |
| *B29C 48/21* | (2019.01) | |
| *B29C 48/18* | (2019.01) | |
| *B32B 1/02* | (2006.01) | |
| *B32B 37/12* | (2006.01) | |
| *B32B 37/15* | (2006.01) | |
| *B29K 27/00* | (2006.01) | |
| *B29K 75/00* | (2006.01) | |
| *A61J 1/14* | (2006.01) | |
| *A61J 1/10* | (2006.01) | |

(52) U.S. Cl.
CPC ............. *B29C 48/022* (2019.02); *B29C 48/08* (2019.02); *B29C 48/18* (2019.02); *B29C 48/21* (2019.02); *B29C 48/22* (2019.02); *B32B 1/02* (2013.01); *B32B 7/12* (2013.01); *B32B 27/304* (2013.01); *B32B 27/306* (2013.01); *B32B 27/32* (2013.01); *B32B 27/40* (2013.01); *B32B 37/1284* (2013.01); *B32B 37/153* (2013.01); *B29K 2027/16* (2013.01); *B29K 2075/00* (2013.01); *B32B 2250/24* (2013.01); *B32B 2274/00* (2013.01); *B32B 2307/412* (2013.01); *B32B 2307/7244* (2013.01); *B32B 2310/0868* (2013.01); *B32B 2327/12* (2013.01); *B32B 2329/04* (2013.01); *B32B 2375/00* (2013.01); *B32B 2439/80* (2013.01); *Y10T 428/1383* (2015.01); *Y10T 428/2848* (2015.01); *Y10T 428/31551* (2015.04)

(58) Field of Classification Search
CPC ......... B32B 27/304; B32B 7/12; B32B 27/40; B32B 2439/80; B32B 2375/00; B32B 2329/04; B32B 2327/12; B32B 2250/24; B32B 2307/7244; B32B 2274/00; B32B 2310/0868; B32B 2307/412; A61J 1/1475; A61J 1/10; A61J 1/1468; Y10T 428/31551; Y10T 428/2848; Y10T 428/1383; B29C 48/08; B29C 48/18; B29C 48/21; B29C 48/22; B29C 48/022; B29K 2027/16; B29K 2075/00
See application file for complete search history.

(56) References Cited

U.S. PATENT DOCUMENTS

| | | | | |
|---|---|---|---|---|
| 4,291,099 A | * | 9/1981 | Strassel | ............ B29C 48/30 428/421 |
| 4,421,236 A | * | 12/1983 | Lowe | ............ B65D 5/701 229/131 |
| 4,714,650 A | | 12/1987 | Obayashi et al. | |
| 4,803,102 A | | 2/1989 | Raniere et al. | |
| 4,973,625 A | * | 11/1990 | Deyrup | ............ B32B 27/08 525/74 |
| 5,419,374 A | | 5/1995 | Nawrot et al. | |
| 5,494,687 A | * | 2/1996 | Polster | ............ A23B 4/0053 426/412 |
| 5,558,930 A | * | 9/1996 | DiPoto | ............ B32B 27/08 428/216 |
| 5,589,028 A | * | 12/1996 | Robinson | ............ B32B 27/08 156/306.6 |
| 5,645,904 A | | 7/1997 | Woo et al. | |
| 5,910,138 A | | 6/1999 | Sperko et al. | |
| 6,001,936 A | * | 12/1999 | Barrera | ............ C08F 283/00 525/454 |
| 6,176,317 B1 | * | 1/2001 | Sepich | ............ E21B 43/0122 166/379 |
| 6,336,988 B1 | * | 1/2002 | Enlow | ............ B05D 1/286 156/238 |
| 6,432,542 B1 | * | 8/2002 | Tsai | ............ B32B 7/12 428/421 |
| 6,753,087 B2 | * | 6/2004 | Jing | ............ C08J 5/124 428/421 |
| 6,780,373 B1 | * | 8/2004 | Musco | ............ B32B 27/34 264/555 |
| 6,835,269 B1 | * | 12/2004 | Miharu | ............ B32B 27/30 156/244.11 |
| 7,011,873 B2 | | 3/2006 | Brule et al. | |
| 2002/0112950 A1 | | 8/2002 | Topolkaraev et al. | |
| 2003/0031891 A1 | | 2/2003 | Fields | |
| 2003/0114614 A1 | | 6/2003 | Wille et al. | |
| 2003/0225201 A1 | | 12/2003 | Yamana et al. | |
| 2004/0023037 A1 | | 2/2004 | Baumert et al. | |
| 2004/0058603 A1 | | 3/2004 | Hayes | |
| 2004/0121099 A1 | | 6/2004 | Brule et al. | |
| 2004/0241482 A1 | | 12/2004 | Grah et al. | |
| 2005/0037165 A1 | | 2/2005 | Ahern et al. | |
| 2005/0050854 A1 | | 3/2005 | Zambaux | |
| 2005/0092429 A1 | * | 5/2005 | Jing | ............ C08J 7/12 156/273.3 |
| 2005/0136205 A1 | | 6/2005 | Stoppelmann et al. | |
| 2005/0175843 A1 | | 8/2005 | Johnson | |
| 2005/0218075 A1 | | 10/2005 | Graetz et al. | |
| 2006/0013977 A1 | | 1/2006 | Duke et al. | |
| 2006/0019650 A1 | | 1/2006 | Kedem | |
| 2006/0024519 A1 | * | 2/2006 | Yamaguchi | ............ B32B 27/32 428/500 |
| 2006/0121224 A1 | * | 6/2006 | Kim | ............ B82Y 30/00 428/35.7 |
| 2006/0121227 A1 | * | 6/2006 | Kim | ............ B32B 1/08 428/36.9 |
| 2006/0160952 A1 | | 7/2006 | Chou et al. | |
| 2006/0193995 A1 | * | 8/2006 | Yong | ............ B32B 5/022 427/533 |
| 2006/0243666 A1 | | 11/2006 | Jenkins et al. | |
| 2006/0246008 A1 | | 11/2006 | Jenkins et al. | |
| 2006/0246244 A1 | | 11/2006 | Jenkins et al. | |
| 2006/0246537 A1 | | 11/2006 | Jenkins et al. | |
| 2006/0251858 A1 | | 11/2006 | Thomas et al. | |
| 2007/0044906 A1 | | 3/2007 | Park | |
| 2007/0116915 A1 | * | 5/2007 | Perre | ............ B32B 27/34 428/43 |
| 2007/0246475 A1 | * | 10/2007 | Mazabraud | ............ B29C 41/04 220/590 |
| 2007/0276107 A1 | * | 11/2007 | Wada | ............ B32B 27/304 526/255 |
| 2008/0096047 A1 | * | 4/2008 | Yamane | ............ B01J 20/06 428/702 |
| 2008/0190918 A1 | * | 8/2008 | Bellmore | ............ B65D 90/046 220/1.6 |
| 2008/0261050 A1 | | 10/2008 | Hartzel et al. | |
| 2009/0202759 A1 | | 8/2009 | O'Brien et al. | |
| 2011/0046286 A1 | * | 2/2011 | Lubnin | ............ C08G 18/12 524/425 |

FOREIGN PATENT DOCUMENTS

| | | |
|---|---|---|
| EP | 1 214 897 A2 | 6/2002 |
| EP | 1 738 896 A1 | 1/2007 |
| JP | 8-142151 A | 6/1996 |
| JP | 2001-193872 A | 7/2001 |
| WO | WO 93/14810 | 8/1993 |
| WO | WO 97/42020 | 11/1997 |
| WO | WO 97/45258 | 12/1997 |
| WO | WO 00/13895 | 3/2000 |
| WO | WO 01/64436 A1 | 9/2001 |

(56) References Cited

FOREIGN PATENT DOCUMENTS

| | | |
|---|---|---|
| WO | WO 02/053360 A2 | 7/2002 |
| WO | WO 02/094911 A2 | 11/2002 |
| WO | WO 2004/039582 A1 | 5/2004 |
| WO | WO 2004/039584 A1 | 5/2004 |
| WO | WO 2004/048086 A2 | 6/2004 |
| WO | WO 2005/115753 A1 | 12/2005 |
| WO | WO 2006/040206 A1 | 4/2006 |
| WO | WO 2006/119053 A1 | 11/2006 |
| WO | WO 2007/078972 A2 | 7/2007 |
| WO | WO 2008/005744 A2 | 1/2008 |

* cited by examiner

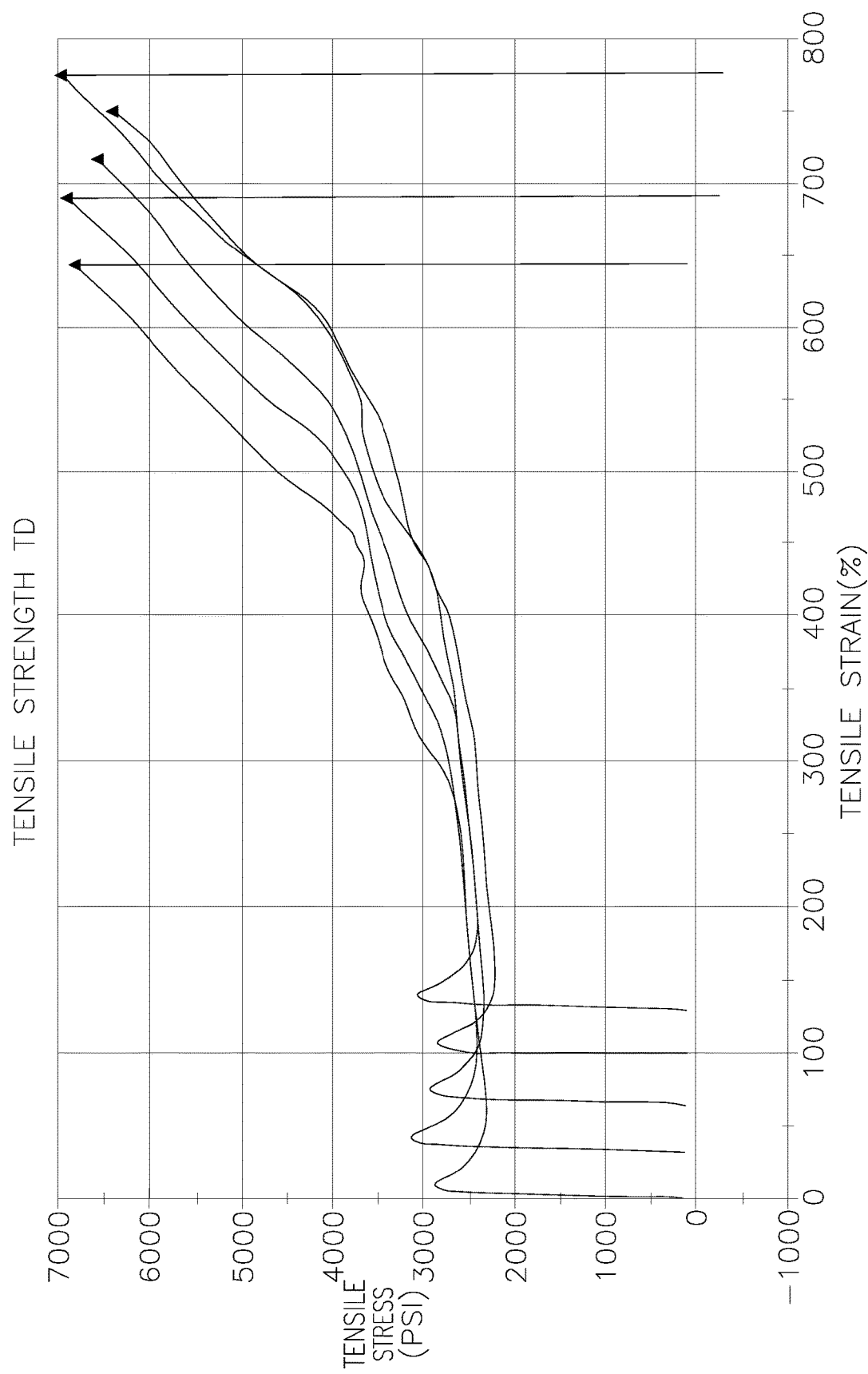

MULTILAYER FILM, METHOD OF MAKING THE SAME AND CONTAINERS FORMED FROM THE SAME

CROSS-REFERENCE TO RELATED APPLICATION(S)

This application is a divisional of and claims priority to and the benefit of U.S. patent application Ser. No. 12/069,187, filed Feb. 8, 2008, now U.S. Pat. No. 9,662,869, which claims priority to and the benefit of U.S. Provisional Application No. 60/900,460 filed Feb. 8, 2007 the entire contents of which are incorporated herein by reference.

BACKGROUND

An important aim of the ongoing research in flexible polymer films is to provide a high-strength, transparent, sterilizable, disposable, leak-free, inert packaging for pharmaceutical and biological fluids. A further aim of ongoing research is to provide flexible polymer film that is sealable using radio frequency (RF).

Desired attributes of polymer films used in the fabrication of flexible disposable containers for pharmaceutical purposes include: ability to seal using RF; clarity; flexibility; endurance, toughness; puncture resistance; non-tackiness; antistatic; chemical inertness; gas barrier; resistance to change during gamma (γ) sterilization. Additionally, flexible thermoplastic-elastomeric barrier film used to form disposable containers for packaging of pharmaceutical raw materials and pharmaceutical products should be essentially free of leachable and extractable material to avoid contamination of the stored material and essentially free of any animal derived materials to avoid concerns with respect to transmissible spongiform encephalopathies (TSEs).

While there are flexible polymer films available for storing pharmaceutical and biological products, there is a need for a flexible film that is RF weldable and not costly to produce.

SUMMARY

In an exemplary embodiment a RF weldable film. The film includes a first exterior layer, a gas barrier layer, and a first inner layer including a thermoplastic polyurethane (TPU) copolymer between the gas barrier layer and the exterior layer. In another exemplary embodiment, the film further includes an adhesive tie layer attaching the inner layer to the gas barrier layer. In a further exemplary embodiment, the gas barrier layer includes an ethylene vinyl acetate-vinyl alcohol copolymer (EVOH) copolymer. In yet a further exemplary embodiment, the exterior layer has a dielectric loss factor (DLF) value of about or greater than 0.05. In another exemplary embodiment, the exterior layer includes a Polyvinylidene Fluoride (PVDF) copolymer. The PVDF copolymer in one exemplary embodiment includes hexafluoropropylene (HFP). In another exemplary embodiment, the PVDF copolymer has a HFP content of less than or equal to 25 wt % of a total PVDF copolymer weight. In yet another exemplary embodiment, the PVDF copolymer has a HFP content ranging from about 10 wt % to about 20 wt % of a total PVDF copolymer weight. In yet a further exemplary embodiment, the PVDF copolymer has a HFP content of about 15 wt % of a total PVDF copolymer weight. In a further exemplary embodiment, the exterior layer includes an ethylene alpha-olefin homopolymer. In yet a further exemplary embodiment, the exterior layer includes an ethylene alpha-olefin polymer including grafted polyethylene (PE). In another exemplary embodiment, the grafted polyethylene has a weight content ranging from about 1 to about 45 wt % of a total ethylene alpha-olefin copolymer weight. In another embodiment, the grafted polyethylene has a weight content ranging from about 5 to about 25 wt % of a total ethylene alpha-olefin copolymer weight. In yet another exemplary embodiment, the grafted polyethylene is selected from a group consisting of butyl ethylene acrylate, ethylene methyl acrylate, and ethylene vinyl acetate. In a further exemplary embodiment, the layer includes a polyester-based TPU copolymer. In one exemplary embodiment, the exterior layer includes a PVDF copolymer including HFP and the gas barrier layer includes an EVOH copolymer. In yet another exemplary embodiment, the exterior layer includes a ethylene alpha-olefin polymer and the gas barrier layer includes an EVOH copolymer. In another exemplary embodiment, an adhesive tie layer is disposed between the exterior layer and the inner layer. In a further exemplary embodiment, the film further includes an adhesive tie layer disposed between the exterior layer and the inner layer.

In yet a further exemplary embodiment, the film also includes a second exterior layer and a second inner layer, wherein the second interior layer is between the gas barrier layer and the second exterior layer, wherein the gas barrier layer is between the two inner layers. The two inner layers may or may not have the same thickness. The two exterior layers also may or may not have the same thickness. In yet another exemplary embodiment, the film further includes a first adhesive tie layer attaching the first inner layer to the gas barrier layer and a second adhesive tie layer attaching the second inner layer to the gas barrier layer. In another exemplary embodiment the film also includes a first adhesive tie layer disposed between the first inner layer and the first exterior layer and a second adhesive tie layer disposed between the second inner layer to the second exterior layer. In yet another exemplary embodiment, both the first and second inner layers include a TPU copolymer. In an exemplary embodiment, the gas barrier layer between the two interior layers includes an EVOH copolymer. In another exemplary embodiment, each of the first and second exterior layers includes an ethylene alpha-olefin homopolymer. In yet another exemplary embodiment, each of the first and second exterior layers includes an ethylene alpha-olefin polymer including grafted polyethylene. In a further exemplary embodiment, each of the first and second exterior layers includes a PVDF copolymer. In yet a further exemplary embodiment, wherein each of the first and second exterior layers includes a PVDF copolymer including HFP.

In another exemplary embodiment, a film is provided including a first layer including an EVOH copolymer, a second layer including a TPU copolymer, the second layer being attached to the first layer, and a third layer attached to the second layer, the third layer being RF weldable. In yet another exemplary embodiment, the film includes a first adhesive layer between the first and second layers. In a further exemplary embodiment, the film also includes a fourth layer attached to the first layer opposite the second layer, where the fourth includes comprising a TPU copolymer. The film further includes a fifth layer attached to the fourth layer, where the fifth layer is RF weldable. In another exemplary embodiment, the film further includes a first adhesive layer between the first and second layers and a second adhesive layer between the first and fourth layers. The film may also include a third adhesive layer between the second and third layers and a fourth adhesive layer between the fourth and fifth layers.

In a further exemplary embodiment a RF weldable film is provided including a first layer including a PVDF copolymer and a second layer attached to the first layer, where the second layer includes a TPU copolymer. In one exemplary embodiment, the first layer has a DLF value of about or greater than 0.05. In another exemplary embodiment, the PVDF copolymer includes HFP.

In another exemplary embodiment, a RF weldable film is provided including a first layer including an ethylene alpha-olefin copolymer, and a second layer attached to the first layer, the second layer including a TPU copolymer. In yet another exemplary embodiment, the ethylene alpha-olefin polymer comprises grafted polyethylene.

In a further exemplary embodiment, a RF weldable film is provided including a first layer including an ethylene alpha-olefin homopolymer and a second layer attached to the first layer, the second layer including a TPU copolymer.

In an exemplary embodiment a method of manufacturing a multilayer film is provided. The method includes providing a first layer, feeding the first layer into an extrusion laminator, simultaneously feeding a second material onto a first side of the first layer and extruding a second layer from the second material onto the first layer to form a two-layer film with the second layer on the first side. The method also includes re-feeding the two-layer film into an extrusion laminator, simultaneously with the two-layer film, feeding a third material onto a second side of the first layer opposite the first side, and extruding a third layer onto the two-layer film to form a three-layer film with the third layer on the first layer second side. In another exemplary embodiment, the method also includes feeding the three-layer film into an extrusion laminator, simultaneously with the three-layer film, feeding a fourth material onto a first side of the three-layer film, and extruding the fourth material to form a fourth layer onto the first side of the three-layer film. The method also includes re-feeding the four-layer film into an extrusion laminator, simultaneously with the four-layer film, feeding a fifth material onto a second side of the three-layer film opposite the first side of the three-layer film, and extruding the fifth material onto the second side of the four-layer film to form a fifth layer onto the second side of the four-layer film.

In a further exemplary embodiment, a container is provided having a first and a second wall. The first wall includes a first layer including a material selected from the group of materials consisting of PVDF copolymers, alpha-olefin homopolymers, and alpha-olefin copolymers including grafted polyethylene, and a second layer comprising a TPU copolymer. The second wall includes a first layer comprising a material selected from the group of materials consisting of PVDF copolymers, alpha-olefin homopolymers, and alpha-olefin copolymers including grafted polyethylene, and a second layer comprising a TPU copolymer, where the first layer of the first wall is bonded to the first layer of the second wall. In a further exemplary embodiment, each wall further includes a third layer including an EVOH copolymer attached to the second layer of each of the walls. In yet a further exemplary embodiment, the container further includes an access port bonded to the first wall and a tube bonded to the port. In an exemplary embodiment, the first layer of the first wall includes a PVDF copolymer and defines an inner surface of the container and the tube and port each includes an inner surface including a PVDF copolymer. In one exemplary embodiment, the tube is RF welded to the port. In a further the exemplary embodiment, the port is RF welded to the first wall. In yet a further exemplary embodiment, the PVDF copolymer in the first wall, the port inner surface and the tube inner surface includes HFP.

In another exemplary embodiment, a container is provided including a first wall and a second wall. The first wall includes a first layer including an EVOH copolymer, a second layer comprising a TPU copolymer, and a RF weldable third layer, such that the second layer is between the first and third layers. The second wall includes a first layer including an EVOH copolymer, a second layer including a TPU copolymer, and a RF weldable third layer, such that the second layer of the second wall is between the first and third layers of the second wall, and such that the third layer of the first wall is bonded to the third layer of the second wall.

The term "disposable" as used herein means, may include any item designed for or capable of being disposed of after use, whereas use may be a one-time or multiple-use as required by the pharmaceutical manufacturing process without the need to sterilize the entire disposable container more than one time.

The term "packaging" as used herein, is not limited to the specifically enclosed embodiments. Packaging, as used herein, includes physical containment of materials and products, protection of contained materials and product from environmental ingress and protection of the environment and operators from egress of contained materials and product.

The phrase "containers" as used herein, is not limited to the specifically enclosed embodiments. The phrase containers may include pillow, rectangular, square, conical and cylindrically shaped bags formed from the flexible RF weldable multilayer film for collection, dispensing, storing, processing, and shipping of pharmaceutical raw materials and pharmaceutical products. The container can be open at the top or can be closed. The container may include access ports which can be located anywhere in the container. The interior volume of the e container can be made to accommodate research and development scale operations or commercial production scale operations. Typically the volume of the disposable container will be at least 10 mL, but preferably at least 100 mL. However, sizes of the container ranging from 10 L to 10,000 L are also possible. Small containers can be used without support structure, while a rigid outer support structure can be used for larger containers. The containers may be disposable or otherwise.

The phrase "pharmaceutical raw materials" as used herein, is not limited to the specifically enclosed embodiments. Pharmaceutical raw materials, as used herein, include raw and in-process biological fluids such as culture media and nutritional components; buffers; aqueous solutions and salt solutions or combinations thereof of varying pH, such as those used in dialysis, chromatography, crystallization, purification; processing solutions composed of either acids, alkali or antifoam agents; water; sanitizing and cleaning detergents; chaotropic solutions and buffers of varying pH for protein refolding, adjuvants, biological materials such as cells, cell debris, cellular components, viruses, antigens; and aliphatic and aromatic organic solvents, such as those used in chemical synthesis, chromatography, crystallization, and extraction.

The phrase "pharmaceutical products" as used herein, is not limited to the specifically enclosed embodiments. Pharmaceutical products, as used herein, include pharmaceutical and biological intermediate, bulk, purified, formulated and final manufactured products.

The phrase "essentially free of leachable and extractable materials", as used herein, means there is either no leachable or extractable material in the flexible RF weldable multilayer film used to form disposable containers or the amount of leachable and extractable material is so low as to not adversely affect the stored or processed product.

The phrase "essentially chemically inert", as used herein, means that the flexible RF weldable multilayer film used to form containers is, as per the required concentration and temperature, chemically compatible with and resistant to the pharmaceutical raw materials and pharmaceutical products stored herein.

The phrase "essentially does not shed particles", as used herein, means that the RF weldable multilayer film used to form containers does not shed particles or that the amount of shed particles is so low as to not adversely affect the stored or product being processed.

The phrase "extremely low water vapor transmission rate (WVTR)", as used herein, means that the RF weldable multilayer film used to form containers has a WVTR lower than 0.1 g/100 in$^2$/24 h gas as determined by ASTM F1249 test standard measured at 23° C. and 100% RH on the test gas side and 0% RH on the carrier gas side.

The phrase "extremely low oxygen transmission rate (OTR)", as used herein, means that the RF weldable multilayer film used to form containers has an OTR lower than 0.1 cc/100 in$^2$/24 h as determined by ASTM F1927 test standard measured at 23° C. and 50% RH on the test gas side and 100% RH on the carrier gas side.

The phrase "essentially does not absorb proteins and lipids", as used herein, means that the RF weldable multilayer film used to form containers does not absorb proteins and lipids or the amount of absorbed proteins and lipids is so low as to not adversely affect the stored or product being processed.

The phrases "no leakage", "fluid containment" and "fluid integrity" as used herein are synonymous and can be use interchangeably.

The phrases "free of any animal derived materials" and "animal derivative free" or "animal derived component free (ADCF)" are synonymous and can be use interchangeably.

The phrases "extremely low water vapor transmission rate (WVTR)", "extremely low oxygen transmission rate (OTR)", "essentially chemically inert", "essentially free of leachable and extractable materials", "essentially does not absorb proteins and lipids" and "essentially does not shed particles" together determine the "product integrity" and can not be used interchangeably.

The phrase "gas barrier" as used herein refers to a barrier that at least significantly restrains gas passage but may or may not completely block gas passage.

BRIEF DESCRIPTION OF THE DRAWINGS

FIGS. 7 & 8 are graphs illustrating tensile strengths in the machine direction and the transverse direction, respectively, of a RF weldable multilayer film according to an exemplary embodiment of the present invention.

DETAILED DESCRIPTION

Figure 1:
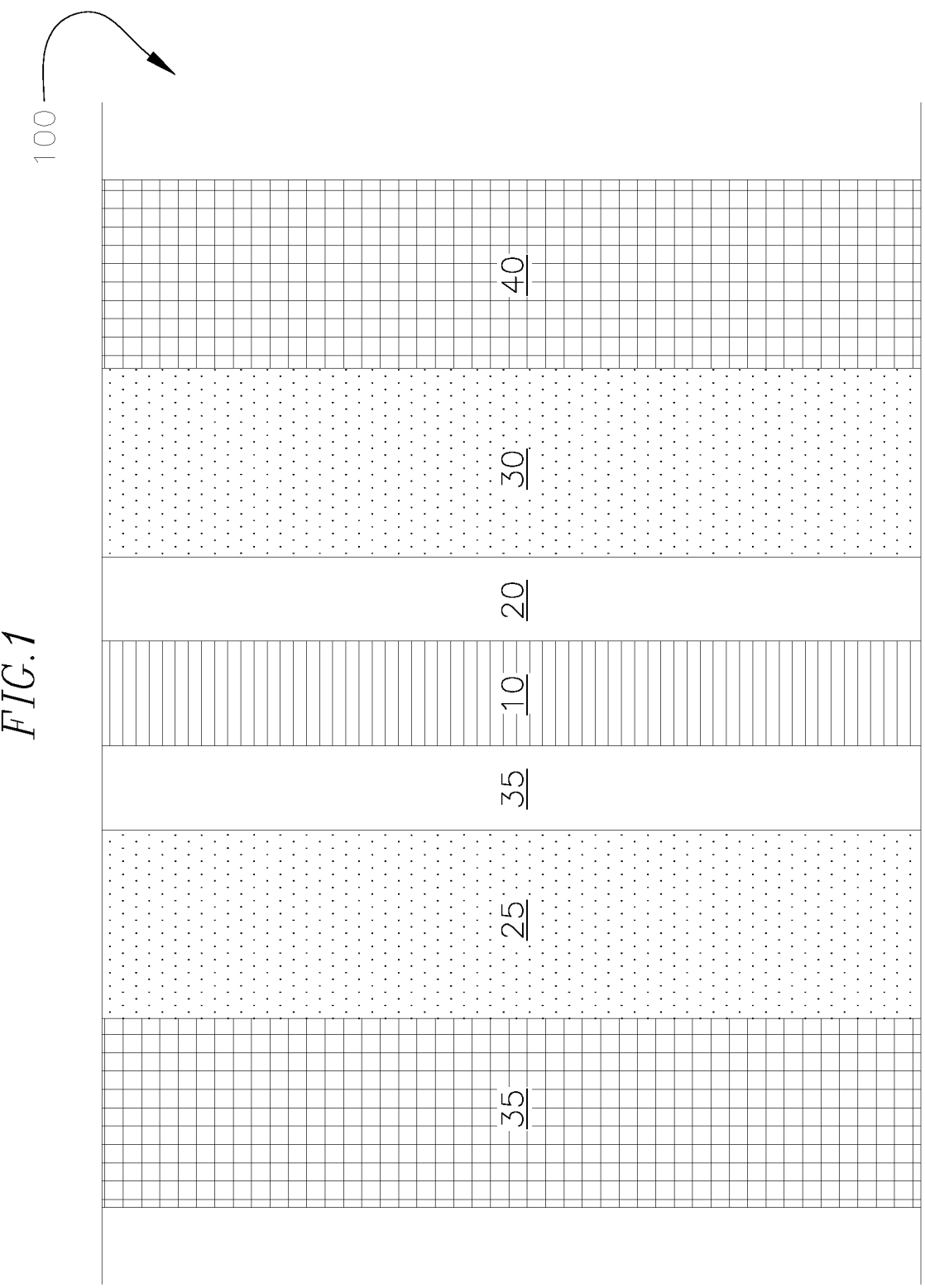
FIG. 1 is a cross-sectional view of a multilayer film, according to an exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein.

The present invention provides for a novel RF weldable multilayer film that may be used to form clear and flexible containers to hold pharmaceutical raw materials and pharmaceutical products. In one embodiment, the inventive multilayer film has improved product integrity as the result of low or extremely low WVTR, low or extremely low OTR. Further, in one embodiment, the multilayer film has a broader chemical resistance, improved levels of leachables and extractable materials, improved levels of nonspecific protein and lipid absorption, and reduced particle shedding.

In one embodiment, the RF weldable multilayer film of the present invention is used to form containers that essentially do not shed particles when subjected to mechanical shear forces. In this way, contamination of stored or processed material can be avoided.

In one embodiment, the RF weldable multilayer film of the present invention is used to form containers, as for example disposable containers capable of withstanding temperatures as low as −80° C. for storing pharmaceutical products. A film that remains flexible and does not become brittle when stored at temperatures as low as −80° C. is required for storing biological materials such as cells as well as protein solutions. In other embodiments, the RF weldable multilayer film of the present invention used to form containers capable of withstanding temperatures as high as 121° C. The film can be made not to melt and to retain its chemical and mechanical properties required for culture of extremophiles at temperatures as high as +90° C. Further, in another embodiment, the film can be made not to melt and to retain its chemical and mechanical properties required for steam connectivity to ancillary stainless steel tanks and processing equipment as high as +121° C. for up to 30 minutes. The inventive film may be used to fabricate containers to hold pharmaceutical raw materials and pharmaceutical products at elevated temperatures.

In addition, the RF weldable multilayer film of the present invention may be used to form containers that can stretch and recover under changing or repeated loads such as loads from repeated filling and dispensing of fluids. The film is made to experience minimum fatigue and permanent set during transportation and shipping without flex cracking.

In various embodiments, the RF weldable multilayer film of the present invention, is used to form containers that essentially do not absorb proteins and lipids to avoid loss of stored or processed product therein. In addition, the inventive film is essentially chemically inert, essentially free of leachable and extractable materials, free of animal derived components, and RF weldable.

RF weldability refers to sealing of a RF active polymer to a portion of itself or to another material using electromagnetic energy, where the electromagnetic energy is typically at 27.1 MHz. RF active means a material susceptible to dielectric activation energy at approximately 27.1 MHz, the application of which includes rapid heating of the material.

Dielectric loss factor (DLF) is an excellent tool to screen materials for RF weldability and is calculated by multiplying a materials' dielectric constant (DC) by its dielectric dissipation factor (DDF) (or loss tangent). The DC and DFF are readily determined by instrumented dielectric testing methods according to the ASTM D150 test standard.

Typically a material with a DLF of less than 0.05 is considered as RF inactive. While a DLF of about 0.05 to about 0.1 is considered as weakly RF active, and a DLF above 0.2 is considered to be very RF active. While a DLF of about 0.05 or greater may produce satisfactory results, it is preferred that a material with a DLF greater than 0.1 is used. More often a DLF of greater than 0.2 is preferred in order to obtain sufficient sealing energy.

RF welding offers several performance advantages over conventional heat sealing. RF welding allows the energy to be concentrated at the RF active layer, thus eliminating a need to transfer heat through an entire film structure. This advantage becomes more evident with increasing film thickness, particularly for films with thicknesses of more than 5 mil.

In conventional thermal sealing, the overall strength of a sealed film is typically not more than 80% of the yield strength of the film because of weakness at the seam. In addition, thermal sealing often requires longer contact time, particularly for thick films, to permit the thermal transfer through the film to the bonding interface. In contrast, RF welding parameters do not correlate with film thickness and the resulting seal strength is often the yield strength of the film. RF welding also has an advantage over conventional thermal sealing when sealing a film with a long width, for example, a width that is greater than 5 feet, as it is difficult to provide a uniform temperature over the entire width of the film using thermal heating elements.

RF welding has yet another advantage over conventional thermal sealing. When a multilayer film contains a thermally sensitive polymer that may soften, it may also shrink, or degrade upon heating. As a result, welding by thermal heating not only can subject films to structural degradation, it may not provide uniform sealing to films with large lengths.

Another advantage RF welding has over conventional thermal sealing is that RF energy can be provided to seal complex shapes. Shapes with a lot of curves or openings make it difficult and expensive to seal using conventional thermal sealing equipment. Yet another advantage of RF welding is that films containing RF susceptible materials in the backing layer immediately adjacent to the exterior skin layer can be sealed by transferring thermal energy to the exterior skin layer.

An exemplary embodiment film of the present invention is a RF weldable film. The invention is now described with reference to FIG. 1, which illustrates a multilayer film 100 according to the present invention.

In the exemplary embodiment, multilayer film 100 is a seven-layer film structure having two exterior skin layers 35 and 40, two inner backing layers 25 and 30 laminated to the inner skin layers preferably without adhesive tie layers. In this exemplary embodiment, inner backing layers 25 and 30 provide additional tensile strength to the resulting film and enhance RF welding capability for the exterior skin layers 35 and 40. As shown in FIG. 1, a gas barrier layer 10 is laminated to the inner backing layers 25 and 30 through adhesive tie layers 15 and 20.

In another embodiment, adhesive tie layers 15 and 20 are not used, hence the resulting film has only five layers. In this exemplary embodiment, the five-layer film has two exterior skin layers 35 and 40, two inner backing layers 25 and 30 laminated to the exterior skin layers, and one gas barrier layer 10 laminated to the inner backing layers 25 and 30 without adhesive tie layers 15 and 20. In yet another embodiment, an additional adhesive tie layer is disposed between each inner backing layer and exterior skin layer, rendering a nine-layer film. These adhesive tie layers in an exemplary embodiment are polyurethane adhesives.

Exemplary embodiments of the multilayer film 100 of the current invention may be fabricated in a thickness ranging from about 6 mil to about 20 mil and widths up to about 60 inches. Preferably, multilayer film 100 has a thickness ranging from 8 mil to 15 mil, and more preferably multilayer film 100 has a thickness of 10 mil. Typical tolerances for the film thickness is ±1 mil and ±0.125 inches for the film width.

The exterior skin layer requires several specific attributes including clarity, flexibility, non-tackiness, toughness, puncture resistance, resistance to change during sterilization by gamma ($\gamma$) irradiation. They may also be antistatic and conform to USP Class VI and ISO 10993 test protocols. In addition, when an exterior skin layer is used as an exterior layer exposed to the environment in containers, in one exemplary embodiment, it needs to be abrasion resistant, chemically inert to protect against accidental spills. It may also need to be printable.

In addition, the exterior skin layer used as fluid product contact layer in containers should be essentially free of leachable and extractable material and essentially does not shed particles to avoid contamination of the stored product. The exterior skin layer should also be compatible with fluids such as pharmaceutical raw materials and pharmaceutical products. Preferably the exterior skin layer should be essentially chemically inert and should essentially not absorb proteins and lipids to avoid loss of stored product. Also, the fluid product contact layer should be animal derived component free and have good barriers to water vapor and gases. Finally, the fluid product contact layer should be preferably composed of a material that can also be injection molded to manufacture access ports weldable to the container, as well as connectors, and extruded or co-extruded into flexible tubing that can be attached to the access ports.

Generally, PVDF can be used as an exterior fluid product contact layer in containers since it is relatively pure. PVDF consisting of fluoro monomers vinylidene fluoride (VF2) is widely accepted in the food and pharmaceutical industry and is an excellent choice for the fluid product contact layer due to its known low extractables profile, high chemical resistance, thermal stability, abrasion resistance, resistance to gamma ($\gamma$) rays, and ease of processability. However, PVDF by itself is not a good candidate for RF welding. In addition it can be expensive, and not transparent and flexible when made into film with a certain thickness, particularly with a thickness that is greater than 10 mil.

In a effort to take advantage of the desired PVDF quality while providing an exterior skin layer that is RF weldable, flexible and has sufficient clarity, in one exemplary embodiment, the film of the present invention includes an exterior skin layer, composed of PVDF copolymer includes fluoro monomers vinylidene fluoride (VF2) and hexafluoropropylene (HFP). The PVDF copolymer with HFP (hereinafter "PVDF copolymer or copolymer) provides the necessary RF welding capability.

In addition to providing RF weldability, an exemplary embodiment PVDF copolymer used to make the exterior skin layer of the film of present invention does not require anti-oxidants, heat stabilizers or processing aids such as lubricants. Further, it has high chemical resistance, good abrasion characteristics and is animal derivative free, making it an excellent candidate for the exterior skin layers exposed to the environment and for fluid product contact in containers.

While HFP provides RF weldability, it can lower the material strength and melting temperature of the resulting copolymer. If a large amount of HFP is used, the resulting film can have low tensile strength, not be autoclavable and be more expensive. On the other hand, if too little amount of HFP is used, the resulting film can be inflexible, be less transparent and not RF weldable. Therefore, the amount of HFP has to be determined based on the desired tensile strength, clarity, RF weldability and pricing.

According to various aspects of embodiments of the present invention, only a small amount of HFP is needed to make a PVDF copolymer film or multilayer film RF weldable. Similarly, any film, port, connector or tubing used in a container can be RF welded to one another and to each other if the exterior skin layer of these components includes a PVDF copolymer with HFP. Preferably, all of the film, port, connector or tubing to be RF welded together all have the same PVDF copolymer with HFP outer layer and having the same HFP weight percentage content.

Accordingly, in one exemplary embodiment, exterior skin layer 35, 40 comprises a PVDF copolymer, where skin layer 35 in a multilayer film 100 may serve as the fluid product contact layer when used to form a container, and exterior skin layer 40 may serve as the exterior layer exposed to the environment in such a container. Each exterior skin layer 35, 40 has a thickness ranging from about 5% to about 35% of the total multilayer film 100 thickness. Preferably, the skin layer 35, 40 has a thickness ranging form about 15% to about 25% of the total thickness of a multilayer film 100.

In one embodiment, the PVDF copolymer of exterior skin layers 35, 40 has less than 25 wt % of its interpolymerized units derived from HFP. In another embodiment, the PVDF copolymer of exterior skin layers 35, 40 has between 10 to about 20 wt % of its interpolymerized units derived from HFP. In yet another embodiment, the PVDF copolymer exterior skin layer has about 15 wt % of its interpolymerized units derived from HFP.

In an exemplary embodiment of the present invention, a PVDF copolymer with a HFP content of about 15 wt % is preferred for film fabrication because at this concentration the PVDF copolymer containing film may be used to make containers as it provides all the necessary properties needed for packaging, storing and processing pharmaceutical raw materials and pharmaceutical products. For instance, a PVDF copolymer containing film with 15 wt % of HFP has good clarity, is autoclavable, capable of undergoing steaming processes which are typically used for sterilization purposes, and at the same time RF weldable. It is also easier to manufacture in terms of reducing the cycle time required for melting and extruding the PVDF copolymer.

In an exemplary embodiment, the PVDF copolymer has a specific gravity from about 1.76 to about 1.82. In another embodiment, the PVDF copolymer has a melting temperature between 115° C. and about 175° C., preferably of between about 125° C. and about 155° C., and more preferably between about 130° C. and about 145° C. In one embodiment, the PVDF copolymer has a melt viscosity of about 600 to about 1500 Pa·s; and a melting point of about 117° C. to about 145° C., preferably of about 130° C. Non-limiting examples of such PVDF copolymers include, but are not limited to, Arkema Kynar® Flex 2500 copolymer, Arkema Kynar® Flex 2750 copolymer, Arkema Kynar® Flex 2800 copolymer, Arkema Kynar® Flex 2850 copolymer and Solvay Hylar® 21508-0001.

These exemplary embodiments are for illustrative purpose only and it is to be understood that the same or equivalent materials may be used in different embodiments that are also intended to be encompassed within the spirit and scope of the invention. For example, other commercially available PVDF copolymers were also considered and have been thought to give similar results such as Solef® and Hylar® from Solvay, especially relevant are the grades with low crystallinity.

While PVDF copolymers as described above have all the desirable properties and are excellent candidates for making exterior skin layers, they still can be cost inhibitive. Accordingly, various exemplary embodiments of the present invention are directed toward exterior skin layer 35, 40 that are composed of thermoplastic polyolefins that are indirectly RF weldable through the heat transferred from the RF susceptible backing layer immediate adjacent to the exterior skin layer or directly RF weldable in a multilayer film 100 of the current invention.

Suitable thermoplastic polyolefins can be selected from a group including homopolymers and copolymers of alpha-olefins containing 2 to 20 carbon atoms, and preferably copolymers of alpha-olefins containing 2 to 10 carbons, and more preferably copolymers of alpha-olefins containing 4 to 8 carbons. Such copolymers are commonly referred to as ultra-low density or linear low density polyethylenes and are indirectly RF weldable in a multilayer film 100 of the current invention.

In an exemplary embodiment the ethylene alpha-olefin polymer includes a grafted polyethylene that enhances its susceptibility to RF welding. In one embodiment the ethylene alpha-olefin copolymer includes a grafted polyethylene content ranging from about 1 to about 45 wt % of a total ethylene alpha-olefin copolymer weight. In another embodiment, the ethylene alpha-olefin polymer includes a grafted polyethylene with a weight content ranging from about 5 to about 25 wt % of a total ethylene alpha-olefin copolymer weight. Suitable grafted polyethylene can be selected from a group consisting of ethylene butyl acrylate, ethylene methyl acrylate, and ethylene vinyl acetate. In another embodiment, exterior skin layer 35, 40 comprises ethylene alpha-olefin copolymers, which are produced using single-site catalyst such as metallocene catalyst and with resins that do not contain slip agents and antiblock, such as MarFlex from Chevron-Philips.

In addition to the exterior skin layer 35, 40 an inner backing layer adjacent to the exterior skin layer is often provided to further improve the structural integrity, further improve the tensile strength and further improve the RF weldability of the exterior skin layer. Referring back to FIG. 1. In this exemplary embodiment, inner backing layer 25, 30 typically has a thickness of about 5% to about 35% of the total thickness of a multilayer film 100. Preferably, inner backing layer 25, 30 has a thickness of about 15% to about 25% of the total thickness of a multilayer film 100. In an exemplary embodiment, the inner backing layer 25, 30 is composed of thermoplastic polyurethane (TPU).

TPU is widely accepted copolymer for use in the food industry and used extensively in medical devices and is a good choice for the inner backing layer due to its high tensile strength, rubber-like elasticity, transparency, exceptional structural memory, high resilience, adhesive properties, ease of processability, resistance to change during gamma (γ) sterilization, and low temperature flexibility. In addition, TPU does not require plasticizers and can be formulated without any animal derived components.

Not only does a TPU copolymer enhance the structural integrity and tensile strength of the exterior skin layer, a TPU copolymer has a DLF of about 0.4 and therefore converts RF energy to thermal energy, thereby generating additional heat that is transferred to the exterior skin layer and useful in the sealing process. In other words, inner backing layers composed of a TPU polymer and immediately adjacent to exterior skin layers can shorten overall sealing contact time.

Accordingly, an exterior skin layer that is composed of a PVDF homopolymer may be RF weldable if an immediately adjacent TPU-containing backing layer is provided. However, an exterior skin layer containing PVDF homopolymer may not be as desirable as it is not flexible and lacks clarity. Applicants have discovered that when an exterior skin layer is composed of PVDF copolymer containing less than 10 wt % HFP, use of an immediate adjacent backing layer composed of TPU copolymer results in an exterior skin layer that is RF weldable. When an exterior skin layer composed of PVDF copolymer containing more than 10 wt % HFP, an immediately adjacent TPU-containing backing layer may also be used but is not necessary, as the exterior skin layer by itself is RF weldable to itself or to other RF weldable materials. Of course, use of a TPU-containing inner backing layer is desired in a multilayer film as it provides the additional tensile strength and RF sealing capability to the resulting film.

There are various TPU materials that can be used for the inner backing layer, including TPU copolymers made from aliphatic or aromatic isocyanates, and polyester or polyether polyols, whereby the type of polyols and isocyanates determine the final properties of the TPU copolymer. In an exemplary embodiment, the TPU material for the inner backing layers in multilayer film is an aromatic isocyanate polyether polyol based TPU copolymer with specific gravity from 1.10 to 1.21. In an exemplary embodiment, the TPU copolymer has a melt flow rate of about 10 to about 40 g/10 min; a tear strength greater or equal to 65 N/mm, preferably greater or equal to 85 N/mm; and a tensile strength greater than 30 MPa, preferably greater or equal to 45 MPa. Examples of TPU copolymers with such a characteristic include, but are not limited to, Noveon Estane® 58887 and BASF Elastollan® 1185A10V.

Another example TPU material that can be used for the inner backing layers in multilayer film is an aromatic isocyanate polyester polyol based TPU copolymer with specific gravity of from about 1.10 to about 1.21, such as Noveon Estane® 58271, Noveon Estane® 58238, BASF Elastollan® 688A10N and BASF Elastollan® 685A10N. Other commercially available polyester and polyether polyol based TPU copolymers considered and thought to give similar results are Pellethane® from The Dow Chemical Company, Texin® from Bayer MaterialScience, and Elastollan® 600 and 1100 series from BASF, and especially TPU copolymers with a Shore A hardness between about 76 and about 91.

Although both polyether and polyester polyol based TPU copolymers are disclosed, a polyester polyol based TPU copolymer may be preferred according to various embodiments of the present invention. It is believed, that a polyester polyol based TPU copolymer provides better adhesion. In contrast, it is believed that a polyether polyol based TPU copolymer does not necessary provide the desired adhesion result with the exterior skin layer composed of PVDF copolymer. It is also believed, that a polyester polyol based TPU copolymer provides better clarity results.

Still referring to FIG. 1. The inner most layer is gas barrier layer 10. In the exemplary embodiment, the gas barrier layer 10 is the most inner core layer of the multilayer film 100. On one side of a gas barrier layer 10, there are adhesive tie layer 15, inner backing layer 25 and exterior skin layer 35. Similarly, on the other side of gas barrier layer 10, there are adhesive tie layer 20, inner backing layer 30 and exterior skin layer 40.

Gas barrier layer 10 with the two adhesive tie layers 15 and 20, when adhesive layers are used, are generally about 5% to about 35% of the multilayer film 100 thickness. In one embodiment, gas barrier layer 10 with two adhesive tie layers 15 and 20 are about 15% to about 25% of the total thickness of multilayer 100.

Gas barrier layer 10 is normally about 2.5% to about 15% of the multilayer film 100 thickness, and in on embodiment, gas barrier layer 10 is about 5% to about 10% of the total multilayer film 100 thickness. The material for gas barrier layer 10 is normally ethylene vinyl acetate-vinyl alcohol copolymer (EVOH).

In one embodiment, the EVOH of gas barrier layer 10 includes about 32% mol % ethylene vinyl acetate (EVA) copolymer, with specific gravity of about 1.20. In the exemplary embodiment, the EVOH copolymer used has a melt flow rate of about 3.7 to about 5 g/10 min. Examples of such material may be commercially available as non-oriented EVAL® EF-F-20 film, biaxial oriented EVAL® EF-XL-15 film, EVAL® F101A non-lubricated, EVAL® F101B lubricated, EVAL® F104A non-lubricated, and EVAL® F104B lubricated copolymer from EVAL Company of America. Again, these exemplary embodiment materials are for illustrative purpose only and it is to be understood that the same or equivalent materials may be used in other embodiments that are also intended to be encompassed within the spirit and scope of the invention.

Although adhesive tie layers 15 and 20 are shown in the exemplary embodiment to render a seven multilayer film 100, in one embodiment adhesive tie layers 15 and 20 are not used. Hence, the resulting multilayer film has only five layers. These adhesive tie layers are typically polyurethane adhesives.

The resulting film 100 of FIG. 1 with or without adhesive tie layers 15 and 20, has a flexible body and has excellent clarity. It has a smooth feel and is not tacky as other films. It is also antistatic. Due to the use of a PVDF copolymer, the flexible multilayer film 100 of the current invention is RF weldable and at the same has excellent performance at low temperature. It remains flexible and does not become brittle when stored at about −80° C.

In other exemplary embodiments, the film may be symmetric or non-symmetric. In a non-symmetric film the two exterior skin layers do not have the same thickness or the two inner backing layers do not have the same thickness or the exterior skin layer and the inner backing layer on side of the gas barrier layer have different thicknesses from the corresponding exterior skin layer and inner backing layer on the other side of the gas barrier layer. In a symmetric film both exterior layers have the same thickness and both inner backing layers have the same thickness.

Accordingly, a PVDF copolymer containing multilayer film 100 of the present invention can be used for fabricating containers for storing pharmaceutical raw materials and pharmaceutical products where a low leachables and extractables profile, a low non specific protein and lipid absorption, film clarity and barriers to both water vapor and gas are highly desired. In addition, multilayer film 100 can be made into containers that are essentially chemically inert to most acids, bases, salts, and aliphatic, aromatic and halogenated hydrocarbons and alcohols.

Various embodiments of the RF weldable film of the current invention are specifically formulated to meet USP Class VI, EP and ISO 10993 requirements. In some embodiments the RF weldable film of the current invention are specifically formulated to omit any animal derived components. In other embodiments, the PVDF copolymer containing multilayer films are free of leachable and extractable aluminum, calcium and zinc. Further in an exemplary embodiment, no plasticizers, oils or surfactants, or other processing aids, such as anti-oxidants and heat stabilizers are used to protect the polymer and film from degradation. Therefore, in such an exemplary embodiment, the PVDF copolymer containing multilayer film of the current invention is free or at least essentially free of leachable and extractable materials, such as plasticizers, anti-oxidants and heat stabilizers.

The multilayer film of the present invention can be sterilized by gamma (γ) radiation. Applicants have discovered that there is no visual or significant physical property change when the multilayer film is exposed to high levels of gamma radiation of up to 50 kGy. In other embodiments of the present invention, the multilayer film structure can withstand high temperature greater than 120° C. and therefore can also be sterilized by autoclaving.

Exemplary embodiments of the flexible film of the current invention have excellent strength to thickness ratios allowing for significant down gauging. In addition, they also have excellent tensile properties, puncture resistance and hysteresis properties. The films also have excellent seam peel strength when RF welded together. The seem peel strength in exemplary embodiments is greater than 80% of the tensile strength of the film. The seam peel strength is an indicator of bond adhesion resulting from the RF welding process.

Although the above described exemplary embodiments are mostly directed toward a five-layer or seven-layer film, applicants believed other multilayer film constructions are also possible based on desirable properties of PVDF and TPU copolymers that applicants discovered. For example, a multilayer film having an inner core layer composed of EVOH copolymer, sandwiched between two backing layers composed of TPU copolymer is desirable to provide a core layer that is both strong and impermeable to gas. This core layer, in turn may be sandwiched between other exterior skin layers, composed of a PVDF copolymer, or an ethylene alpha-olefin homopolymer, or an ethylene alpha-olefin polymer that includes a grafted polyethylene of the present invention. This core layer in other exemplary embodiments, may be sandwiched between other types of exterior layer. In yet further exemplary embodiments, this core layer may form an external layer of a film.

Similarly, a film that includes only two layers can be used by itself to make various containers or articles when a gas barrier function is not required. In this respect, one layer may be composed of a PVDF copolymer, or an ethylene alpha-olefin homopolymer, or an ethylene alpha-olefin polymer that includes a grafted polyethylene, and the other layer is composed of a TPU copolymer. In this way, the resulting film has both sufficient tensile strength and RF welding capability.

Figure 2:
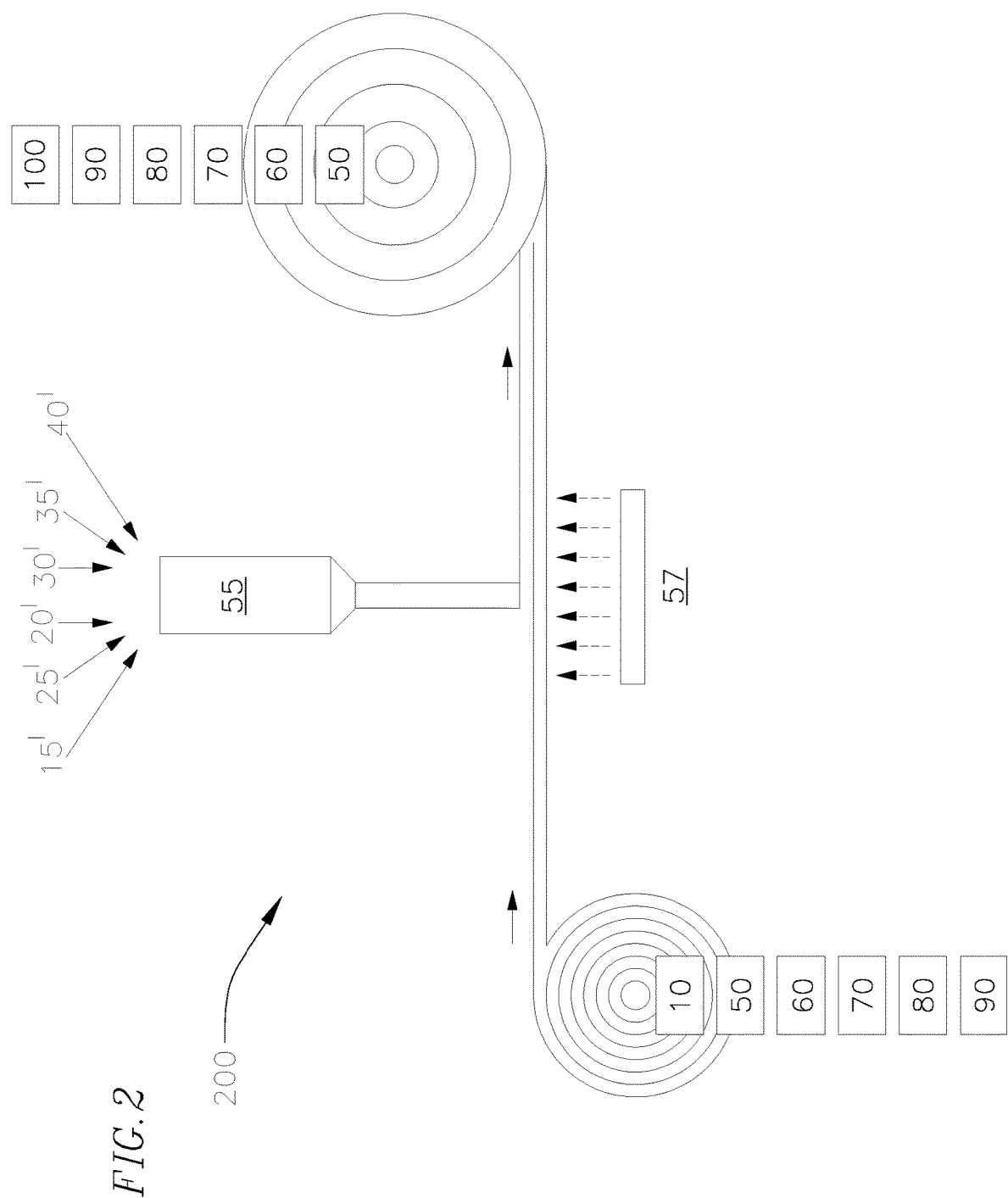
FIG. 2 is a view of an extrusion lamination arrangement used to manufacture a multilayer flexible film, according to an exemplary embodiment of the present invention.

Another aspect of the present invention is directed towards a method of manufacturing a RF weldable multilayer film 100. The invention is now described with reference to FIG. 2, which illustrates a simplified manufacturing line 200 for making a RF weldable multilayer film 100.

First, core film 10, which can be an EVOH film, is fed into the extrusion laminator as adhesive composition 15' is fed simultaneously into the single film casting die 55 and extruded onto one side of the core EVOH film to form a two-layer film 50. The two-layer film 50 has a core EVOH layer 10 and an adhesive layer 15. The film is then allowed to cool and then reeled into a roll.

Next, the newly developed two-layer film 50 is re-fed into the extrusion laminator. Simultaneously a layer of core composition 20', which may also be an adhesive, is disposed on top of the uncovered core film 10 of the two-layer film 50 to form a three-layer film 60. The three-layer film 60 has a core EVOH layer 10 and an adhesive layer 15 on one side, and a new adhesive layer 20 on the other side. The newly formed three-layer film is allowed to cool and then reeled into a roll.

The process is then repeated with the three-layer film 60 and composition 25', which can be a TPU composition, to form a four-layer film 70. The four-layer film 70 has a core EVOH layer 10, adhesive layer 15, the newly formed TPU layer 25 on one side, and an adhesive layer 20 on the other side. The newly formed four-layer film 70 is allowed to cool and then reeled into a roll.

The process is then repeated with the four-layer film 70 and a TPU composition 30', which can be the same composition as that of composition 25', to form a five-layer film 80. The five layer film 80 has a core EVOH layer 10, adhesive layer 15, TPU layer 25 on one side, and an adhesive layer 20 and a newly formed TPU layer 30 on the other side. The newly formed five-layer film 80 is allowed to cool and then reeled into a roll.

The process is then repeated with the five-layer film 80 and a PVDF or ethylene alpha-olefin copolymer composition 35' to form a six-layer film 90. The six layer film 90 has a core EVOH layer, adhesive layer 15, TPU layer 25, a newly formed PVDF or ethylene alpha-olefin copolymer exterior skin layer 35 on one side, and an adhesive layer 20 and TPU layer 30 on the other side. The newly formed six-layer film 90 is allowed to cool and then reeled into a roll.

The process is then repeated one last time with film 90 and a PVDF or ethylene alpha-olefin copolymer composition 40', which can be the same composition as that of composition 35', to form a seven-layer film 100, with a newly formed PVDF or ethylene alpha-olefin copolymer exterior skin layer 40 disposed next to TPU layer 30. The film is then allowed to cool and then reeled into a roll.

Additionally, the manufacturing may further include a corona discharge bar 57 for corona treatment of at least one side of the multilayer film 100 allowing for later printing. It should be further noted that multilayer film 100 may subsequently be slit to various widths to form film rolls that can be used to form containers of various sizes and shapes.

In other exemplary embodiments, the inventive RF weldable multilayer film may also be manufactured using cast or blown film co-extrusion. Also, while a seven-layer film process is shown, it should be understood that a five-layer film or other multilayer film, such as a nine-layer film, can also be manufactured by this process by omitting or adding certain compositions, including adhesive tie layers, such as the addition of a third and a fourth adhesive tie layer, or omitting for example compositions 15' and 20'.

The seven-layer film structure or five-layer film structure manufactured by the disclosed process or similar process can be used for making containers. The film can be sealed to make enclosures such as bags and other containers by RF welding, heat welding, or by other conventional bag manufacturing methods.

Figure 3:
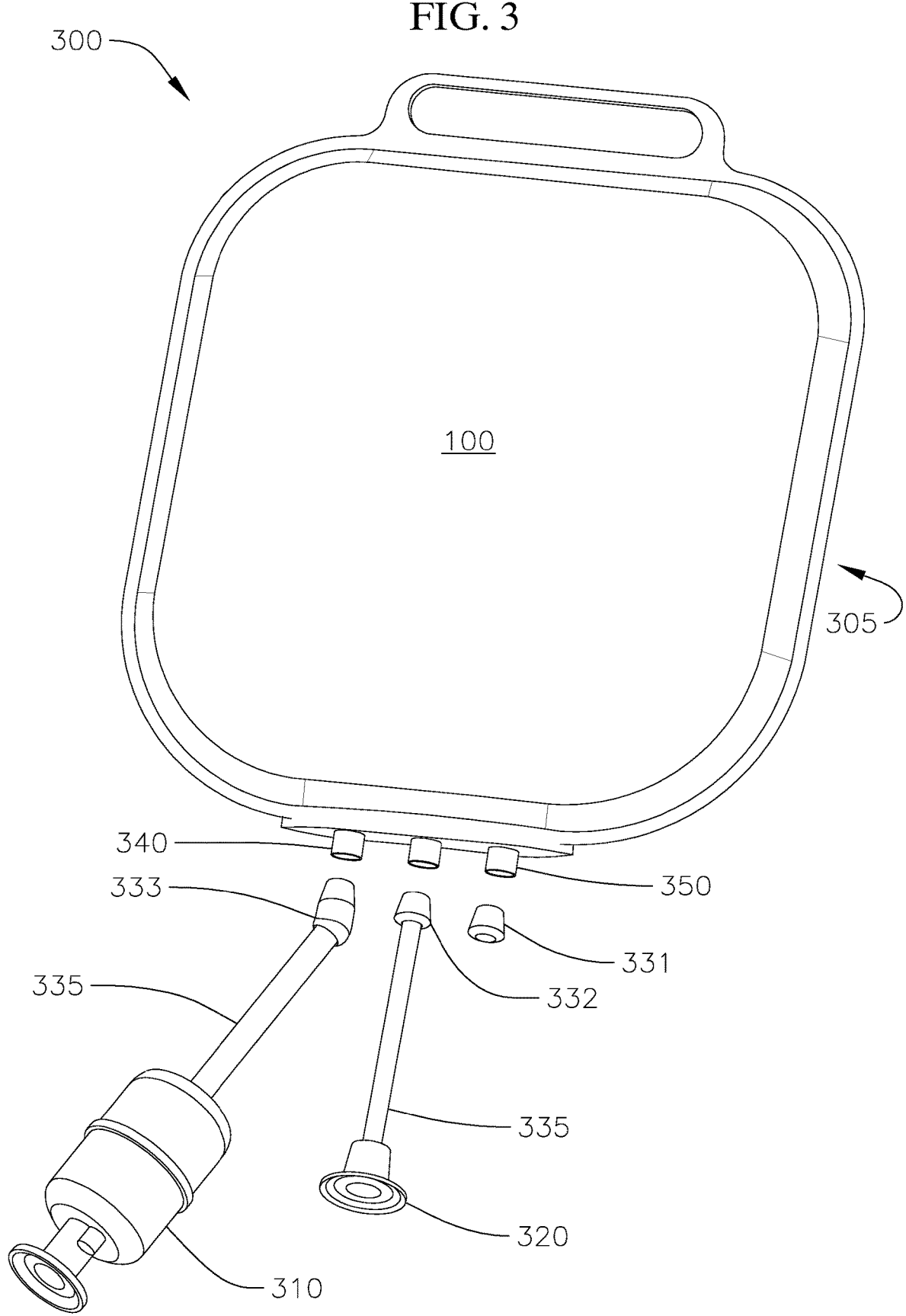
FIG. 3 is a perspective view of a flexible container made from a RF weldable multilayer film comprising a universal port plate RF welded to it according to one exemplary embodiment of the present invention.

FIG. 3 shows an exemplary embodiment of a disposable container made of a multilayer film of the present invention. Disposable containers, such as a 2D pillow-style bags 300 are formed by RF welding a multilayer film 100 of the current invention.

A bag 300 includes a universal boat port 350 permanently RF welded to it with at least two, preferably three female port adapters 340 configurable to meet various applications to introduce fluids into the bag and dispense fluids from the bag through flexible tubing 335 attached to the female port adaptors 340 through mating male port connectors such as, straight connectors 332, angled connectors 333, and reducers (not shown). Flexible tubing 335 may be connected to a connector 320 at its terminal, to a disposable filter 310, to a disposable valve (not shown) or be connected to another container (not shown) to form a manifold. The male port connectors may further include blind plugs 331, septum ports (not shown), dip tubes of varying lengths (not shown), and male port adapters with embedded disposable electronic sensors (not shown), such as to measure temperature, pressure, pH, oxygen, and carbon dioxide. It should be further noted that port connectors may also have hose barb or other sanitary end fittings as known in the art.

One preferred material for universal boat port 350, female port adaptors 340, male port connectors, such as 331, 332 and 333, and end connectors 320 is PVDF copolymer including fluoro monomers VF2 and HFP. Typically, these PVDF copolymers have less than about 25 wt %, preferably between about 10 and about 20 wt % of its interpolymerized units derived from HFP, and more preferably about 15 wt % of its interpolymerized units derived from HFP. A HFP content higher than 20 wt % is not desirable as it may render the ports, and connectors too weak for its intended use.

These PVDF copolymers may have a specific gravity from about 1.76 to about 1.82, such as Arkema Kynar® Flex 2500 copolymer, Arkema Kynar® Flex 2750 copolymer, Arkema Kynar® Flex 2800, and Arkema Kynar® Flex 2850 copolymer and Solvay Hylar® 21508-0001. Other commercial available PVDF copolymers were also considered and have been thought to give similar results such as Solef® and Hylar® from Solvay, especially relevant are PVDF copolymers with low crystallinity.

Various exemplary embodiments for flexible tubing 335 are now described. In one exemplary embodiment a single-layer flexible tubing 335 can be made through extrusion of the same PVDF copolymers as disclosed for the ports and adapters. In another exemplary embodiment a two-layer flexible tubing 335 can be made through co-extrusion of an inner fluid product contact layer composed of a PVDF copolymer, and an exterior skin layer exposed to the environment composed of a TPU copolymer as disclosed in the RF weldable multilayer film of the present invention. In yet another exemplary embodiment the flexible tubing 335 has a fluid product contact layer composed of a PVDF copolymer. In an exemplary embodiment the PVDF copolymer has the same HFP content as the PVDF copolymer used to make ports, connectors, and the RF weldable multilayer film of the present invention. In this regard, a total fluid path is provided between the tubing and the container that is composed of the same fluid product contact material.

Although the above described exemplary embodiments are mostly directed towards a single-layer or two-layer tubing, applicants believed other multilayer tubing constructions are also possible based on desirable properties of PVDF and TPU copolymers that applicants discovered. One such example is a four-layer flexible tubing 335 consisting of a fluid product contact layer composed of a PVDF copolymer, an immediately adjacent backing layer composed of a TPU copolymer, a gas barrier layer composed of an EVOH copolymer, and an exterior skin layer exposed to the environment composed of a TPU copolymer, whereby the EVOH layer is sandwiched between the backing layer and the exterior skin layer.

In exemplary embodiments, these PVDF copolymers used in the tubing have less than about 25 wt %, preferably between 10 and about 20 wt % of its interpolymerized units derived from HFP, and more preferably about 15 wt % of its interpolymerized units derived from HFP. In this way, RF welding capability is provided to tubing 335, which is desirable to make a permanent connection of tubing 335 to any port or connector composed of PVDF copolymers with similar HFP content.

Flexible bag 300 may be formed by RF welding or heat sealing two plies of a flexible multilayer barrier film 100 at the inner surfaces of their outer peripheries along the edges of the walls 305 of the bag 300. Certain embodiments of bag 300 have excellent high temperatures properties and can be sterilized by autoclaving at a temperature of 121° C. for at least 15 minutes or allow for steam connectivity. Flexible bag 300 can be sterilized by gamma (γ) irradiation.

Figure 4:
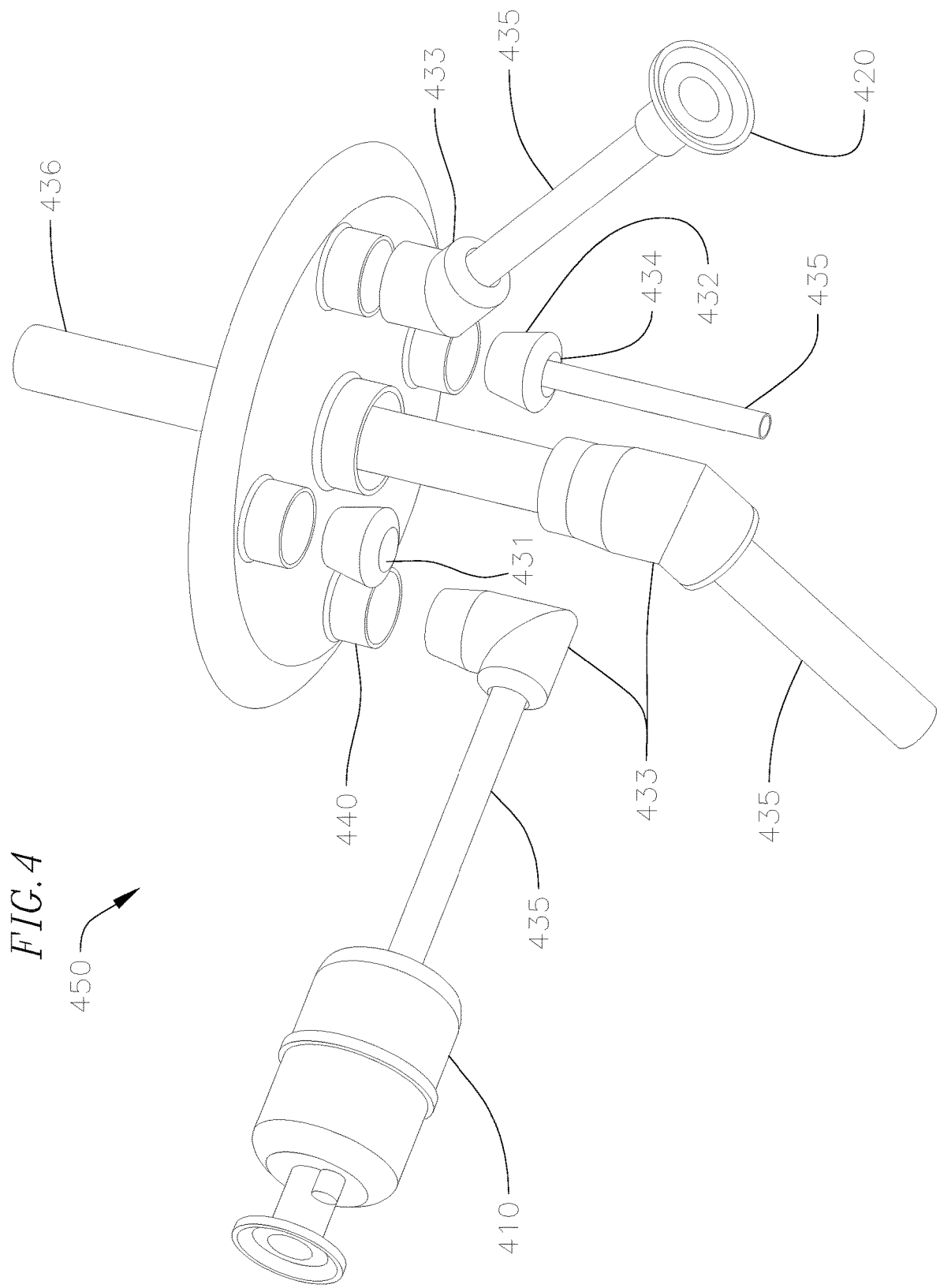
FIG. 4 is exploded view of a universal RF weldable round port plate according to an exemplary embodiment of the present invention.

FIG. 4 shows a universal round port plate 450 that is RF weldable to a disposable container made from a multilayer film of the current invention.

Universal round port plate 450 comprises at least four, preferably five, female port adapters 440 including preferably one centerline female port adapter, configured to introduce fluids into the disposable container and dispense fluids from the disposable container through flexible tubing 435.

Flexible tubing 435 is attached to female port adaptors 440 though mating male port connectors such as, straight connectors 432, angled connectors 433, and reducers 434. Flexible tubing 435 may be connected to a connector 420 at its terminal, to a disposable filter 410, to a disposable valve (not shown) or be connected to another disposable container (not shown) to form a manifold. The male port connectors may further include blind plugs 431, dip tubes 436 of various lengths, septum ports (not shown) and male port adapters with embedded disposable electronic sensors (not shown), such as to measure temperature, pressure, pH, oxygen, carbon dioxide. It should be further noted that port connectors may also have hose barb or sanitary end fittings as known in the art.

One preferred material for universal boat port 450, female port adaptors 440, male port connectors, such as 431, 432, 433, 434, 436, and end connectors 420 is PVDF copolymer with specific gravity from about 1.76 to about 1.82. Typically, these PVDF copolymers have less than about 25 wt %, preferably between about 10 wt % and about 20 wt % of its interpolymerized units derived from HFP, and more preferably about 15 wt % of its interpolymerized units derived from HFP. Examples of such materials include Arkema Kynar® Flex 2500 copolymer, Arkema Kynar® Flex 2750 copolymer, Arkema Kynar® Flex 2800, Arkema Kynar® 2850 copolymer and Solvay Hylar® 21508-0001.

Other commercially available PVDF copolymers are thought to give similar results. Such copolymers include Solef® and Hylar® from Solvay, and other PVDF copolymers with low crystallinity. Besides PVDF copolymers, other materials that are compatible to PVDF copolymers or RF weldable may also be used.

Although in the exemplary embodiments TPU copolymer and EVOH copolymer for gas barrier is not needed, it can certainly be used in the construction of these ports, tubing and adapters as well. One example is the use of EVOH gas barrier as an inner layer in PVDF and TPU co-extruded multi-layer tubing that might be in contact with pharmaceutical raw materials and pharmaceutical products for a prolonged period of time.

In an exemplary embodiment, flexible tubing 435 is made from elastomeric materials such as silicone and SEBS copolymers.

EXAMPLES

Certain examples and test data for multi-layer films according to the present invention are depicted in Table 1 and Table 2.

Table 1. Physical Characteristics of PE and PVDF Copolymer Multilayer Films

Example 1 is a symmetrical five-layer barrier film fabricated by cast co-extrusion with a thickness of about 10 mil. Example 1 has an EVOH gas barrier core layer of about 0.8 mil, or about 8% of the total multilayer film thickness, one TPU inner backing layer on each side of the EVOH layer having about 2.3 mil in thickness, or about 23% of the total multilayer thickness, and one PVDF exterior skin layer on each side of the TPU inner backing layer having about 2.3 mil, or about 23% of the total thickness of multilayer film 100.

The EVOH gas barrier layer in Example 1 is composed of EVAL® F104B copolymer comprising 32 mol % EVA copolymer. It has a specific gravity of about 1.2, and a melt flow rate of 4.4 g/10 min according to ISO 1133 test standard (190° C., 2160 g).

The TPU inner backing layer in Example 1 is composed of BASF Elastollan® 685A10N000 copolymer comprised of an aromatic isocyanate polyester polyol with specific gravity of about 1.21. It has a tensile strength of 48 MPa according to DIN 53504 test standard, a tear strength of 125 N/mm according to DIN ISO 34-1 Bb test standard, and a melt flow rate of 23 g/10 min according to ISO 1133 test standard (190° C., 2160 g).

The PVDF exterior skin layer in Example 1 is composed of Arkema Kynar® Flex 2750-13 copolymer with a specific gravity from about 1.78 to about 1.80. It has a melt viscosity of about 736 Pa·s according to ASTM D3835 test standard (230° C., 100 s$^{-1}$) and a melting point of about 130° C.

The PE film data in Table 1 and Table 2 are provided for comparison purposes only and should serve to give an indication of how the multilayer barrier films of the current invention relate to a typical PE based multilayer barrier film in use today. The data provided on the PE film are intended to be representative of a typical commercial film. Accordingly, the film's properties may change slightly depending on the manufacturer and batch tested. Example 1 is RF weldable, while PE film is not. In terms of thickness, the PE film is measured at 14 mil±1 mil in thickness, while Example 1 is only about 10 mil±1 mil. The thickness is measured using a micrometer.

Table 2 shows various tensile properties of comparative PE film and the exemplary embodiment, Example 1, of the present invention

| Properties | Test Method | Units | PE Film | Example 1 |
|---|---|---|---|---|
| Film Manufacturing | | | | |
| Process | | | Cast co-extrusion | Cast co-extrusion |
| Electrical | | | | |
| DLF | ASTM D150 | | <0.001 | >0.05 |
| RF weldability | | | No | Yes |
| Physical | | | | |
| Thickness | Micrometer | mil | 14 | 10 |
| Haze | ASTM D1003 | % | 20 | <20 |
| Water Vapor and Gas Transmission | | | | |
| Water vapor transmission rate (WVTR) | ASTM F1249 (23° C., 100% RH test gas, 0% RH carrier gas) | g/100 in$^2$/24 h | 0.022 | 0.093 |
| Oxygen transmission rate (OTR) | ASTM F1927 (23° C., 50% RH test gas, 100% RH carrier gas) | cc/100 in$^2$/24 h | 0.019 | 0.078 |
| Sterilization | | | | |
| Gamma (γ) irradiation dose | Dosimeter | kGy | 25-40 | 25-40 |
| Gamma (γ) resistance, color change | Visual inspection | | None | None |

Table 1 shows various physical characteristics of multilayer films made of typical polyethylene (PE) and a multilayer film of the present invention. As shown,

TABLE 2

Tensile properties of PE and PVDF copolymer multilayer films.

| Tensile Properties | Test Method | Units | PE Film | Example 2 |
|---|---|---|---|---|
| Tensile strength at yield, MD | ASTM D882 | psi | 1,279 | 2,500 |

TABLE 2-continued

Tensile properties of PE and PVDF copolymer multilayer films.

| Tensile Properties | Test Method | Units | PE Film | Example 2 |
|---|---|---|---|---|
| Tensile strength at yield, TD | ASTM D882 | psi | | 2,470 |
| Tensile strength at break, MD | ASTM D882 | psi | 2,893 | 5,740 |
| Tensile strength at break, TD | ASTM D882 | psi | | 5,760 |
| Elongation at break, MD | ASTM D882 | % | 710 | 640 |
| Elongation at break, TD | ASTM D882 | % | | 650 |
| Secant modulus at 2% strain, MD | ASTM D882 | psi | 35,100 | 63,500 |
| Toughness, MD | ASTM D882 | lbf-in. | 414 | 414 |
| Toughness, TD | ASTM D882 | lbf-in. | | 353 |

In Table 2, the abbreviations MD and TD refer to the machine direction (MD) and the transverse direction (TD) of the film. The machine direction (MD) of a film may be defined as the direction in which the film is pulled during its production or the direction in which the film is taken up on rolls. The transverse direction (TD) may be defined as being perpendicular to the MD within the plane of the film. Mechanical properties are measured in this manner because long chain molecules within polymer films tend to become oriented in the direction of strain, usually the machine direction in cast films. The tensile strength at yield, tensile strength at break, elongation at break and toughness data in Table 2 for PE film is the average of the MD and TD data points of the film.

Tensile properties, namely tensile strength, elongation and modulus are often measured in accordance with a laboratory test procedure utilizing a test instrument which applies a load to a specimen though a constant rate of motion. While PE film is ticker than the multilayer film of Example 1, Example 1 provides better results in terms of tensile strength at yield and at break points in both the machine direction and the transverse direction of the film with comparable elongation and toughness.

Figure 7:
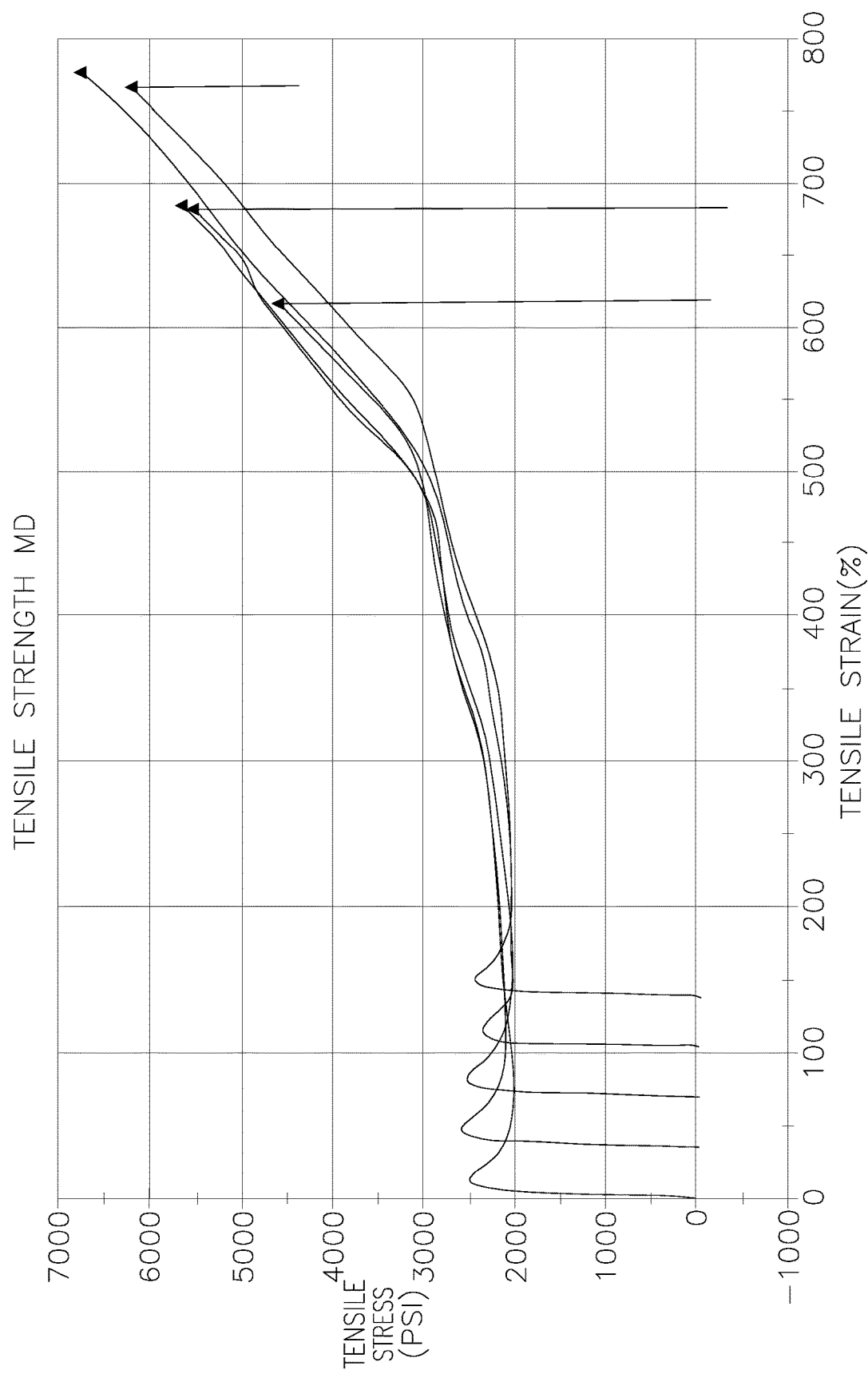

FIGS. 7 and 8 are graphs illustrating tensile stress vs. tensile strain in the MD and TD directions, respectively, on five different tests performed on different areas of the multilayer film of Example 1. Bond strength tests were also performed. In this test, the five-layer construction is attempted to be separated respectively at each of four interfaces between two adjacent layers across the five-layer film structure, and to determine adhesion force between each of these adjacent layers. None of the two adjacent layers, however, could be delaminated because of the strong unified bond between them.

PVDF Copolymer and TPU Copolymer Example

Table 3 shows material adhesion test results of exterior skin layers composed of different PVDF copolymers and inner backing layers composed of different TPU copolymers. As mentioned previously, the TPU layer is added to promote strength to the exterior skin layer and to enhance RF weldability of the exterior skin layer.

To find an appropriate PVDF-TPU material combination, various PVDF copolymers and TPU copolymers were selected from different suppliers, grades, and physical characteristics, such as melt flow index (MFI) and viscosity to test and determine suitable PVDF-TPU material combinations that have proper adhesion and sufficient peel strength.

First, various PVDF copolymers and TPU copolymer granules were selected. The granules were then pressed into a 1 mm thick sheet using a Collin P200P platen press at 200° C. and at varied pressures. There are 5 zones in the platen press cycle, where process parameters such as cycling time and pressure can be varied. In this exemplary embodiment, all zones were operated at 200° C. with the cycling time ranging from 10 to 40 seconds, and pressure ranging form 0 to 100 bar.

At zone 1 there was no pressure applied. At zone 2, the cycle time was set for 10 seconds and the pressure was set at 25 bar. At zone 3, the cycle time was set for 10 seconds and the pressure was set at 50 bar. At zone 4, the cycle time was set for 30 seconds and the pressure was set at 100 bar. Lastly, at zone 5 where cooling takes place for 40 seconds at a pressure of 100 bar. The same cycle for both initial pressing of the granules into sheet and for adhesion tests was used.

After the granules were pressed into sheet using a 5 zone platen press cycle a resulting 1 mm pressed sheet was produced. Combinations of individual PVDF copolymer and TPU copolymer pressed sheets were then used to assemble lap-joint samples to test initial adhesion between the PVDF copolymer and the TPU copolymer. Peel test samples were then produced for any PVDF-TPU combination that displayed visible adhesion in a lap-joint. A metal frame was used to prevent the sandwiched sheets of material from being squeezed uncontrollably when assembling lap-joint specimens. Test specimens were pressed at 200° C. and at 100 bar.

The peel tests were conducted using an Instron 4411 Universal Tester with a load cell of 5 kN at a constant crosshead speed of 50 mm/min and with an initial gauge length of 50 mm. Peel strength was determined as load (N) per sample width (mm). The results are shown in Table 3. Sample width was always taken form the PVDF copolymer side and 5 samples per combination were tested. Table 3 shows melt flow index (MFI) in g/10 min which was determined at 200° C. using a load of 2160 g. MFI for Kynar® Flex 2750-01 could not be obtained at 200° C., instead MFI has been determined at 240° C.

TABLE 3

Adhesion and Peel Strength of PVDF-TPU copolymers combinations.

| Test Sample | Side 1: PVDF Copolymers | | | | Side 2: TPU Copolymers | | | | Adhesion (Y/N) | Peel Strength (N/mm) |
|---|---|---|---|---|---|---|---|---|---|---|
| | Supplier | Product | Grade | MFI | Supplier | Product | Grade | MFI | | |
| 1 | Arkema | Kynar® Flex | 2750-01 | 0 (0.09 at 240° C.) | Noveon | Estane® | 58887 nat 020 | 1.61 | N | — |

TABLE 3-continued

Adhesion and Peel Strength of PVDF-TPU copolymers combinations.

| Test Sample | Side 1: PVDF Copolymers | | | | Side 2: TPU Copolymers | | | | Adhesion (Y/N) | Peel Strength (N/mm) |
|---|---|---|---|---|---|---|---|---|---|---|
| | Supplier | Product | Grade | MFI | Supplier | Product | Grade | MFI | | |
| 2 | Arkema | Kynar® Flex | 2750-01 | 0 (0.09 at 240° C.) | Noveon | Estane® | 58887 nat 036 | 2.06 | N | — |
| 3 | Arkema | Kynar® Flex | 2750-13 | 1.35 | Noveon | Estane® | 58887 nat 020 | 1.61 | N | — |
| 4 | Arkema | Kynar® Flex | 2750-13 | 1.35 | Noveon | Estane® | 58887 nat 036 | 2.06 | N | — |
| 5 | Arkema | Kynar® Flex | 2750-01 | 0 (0.09 at 240° C.) | BASF | Elastollan® | 1185A10 | 5.82 | N | — |
| 6 | Arkema | Kynar® Flex | 2750-01 | 0 (0.09 at 240° C.) | BASF | Elastollan® | SP806-10 | 2.42 | N | — |
| 7 | Arkema | Kynar® Flex | 2750-13 | 1.35 | BASF | Elastollan® | 1185A10 | 5.82 | N | — |
| 8 | Arkema | Kynar® Flex | 2750-13 | 1.35 | BASF | Elastollan® | SP806-10 | 2.42 | N | — |
| 9 | Arkema | Kynar® Flex | 2750-01 | 0 (0.09 at 240° C.) | Noveon | Estane® | 58271 nat 021 | 11.70 | Y | 0.73 |
| 10 | Arkema | Kynar® Flex | 2750-13 | 1.35 | Noveon | Estane® | 58271 nat 021 | 11.70 | Y | 1.65 |
| 11 | Arkema | Kynar® Flex | 2750-01 | 0 (0.09 at 240° C.) | BASF | Elastollan® | 685A10N | 3.00 | Y | 1.88 |
| 12 | Arkema | Kynar® Flex | 2750-13 | 1.35 | BASF | Elastollan® | 685A10N | 3.00 | Y | 2.32 |
| 13 | Solvay | Hylar® | 21508-0001 | 3.42 | Noveon | Estane® | 58887 nat 020 | 1.61 | N | — |
| 14 | Solvay | Hylar® | 21508-0001 | 3.42 | Noveon | Estane® | 58887 nat 036 | 2.06 | N | — |
| 15 | Solvay | Hylar® | 21508-0001 | 3.42 | BASF | Elastollan® | 1185A10 | 5.82 | N | — |
| 16 | Solvay | Hylar® | 21508-0001 | 3.42 | BASF | Elastollan® | SP806-10 | 2.42 | N | — |
| 17 | Solvay | Hylar® | 21508-0001 | 3.42 | Noveon | Estane® | 58271 nat 021 | 11.70 | Y | 1.35 |
| 18 | Solvay | Hylar® | 21508-0001 | 3.42 | BASF | Elastollan® | 685A10N | 3.00 | Y | 1.84 |

Table 3 shows that adhesion between PVDF copolymers and TPU copolymers is achieved whenever Kynar® Flex 2750-01 or Kynar® Flex 2750-13 are used with Noveon Estane® 58271 nat 021 or BASF Elastollan® 685A10N. Similarly, good adhesion is also achieved whenever Solvay Hylar® 21508-0001 is used with Noveon Estane® 58271 nat 021 or BASF Elastollan® 685A10N.

Figure 5:
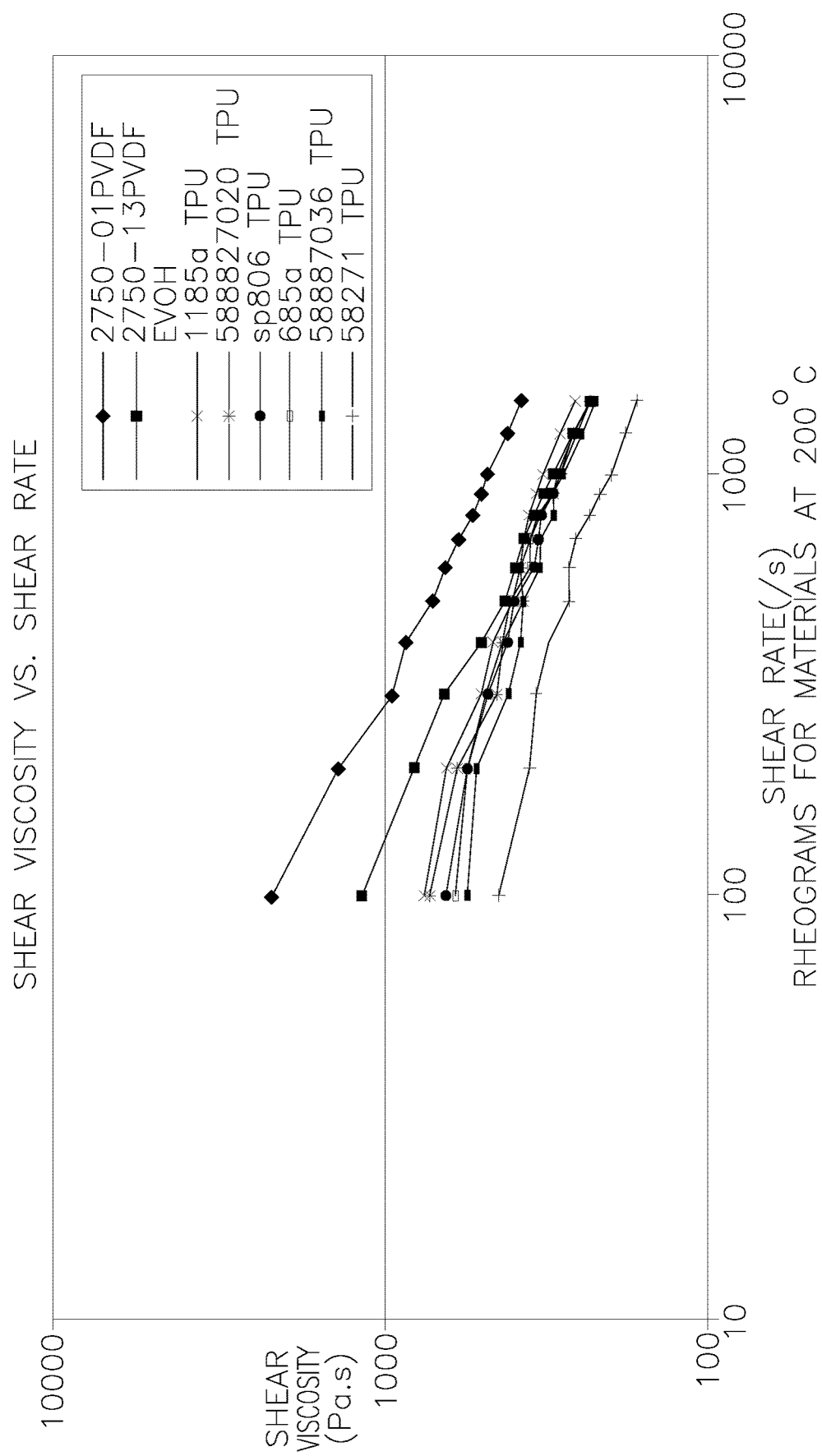
FIG. 5 is a graph illustrating shear viscosity vs. shear rate of various materials considered in manufacturing RF weldable multilayer films according to various exemplary embodiments of the present invention.
Figure 6:
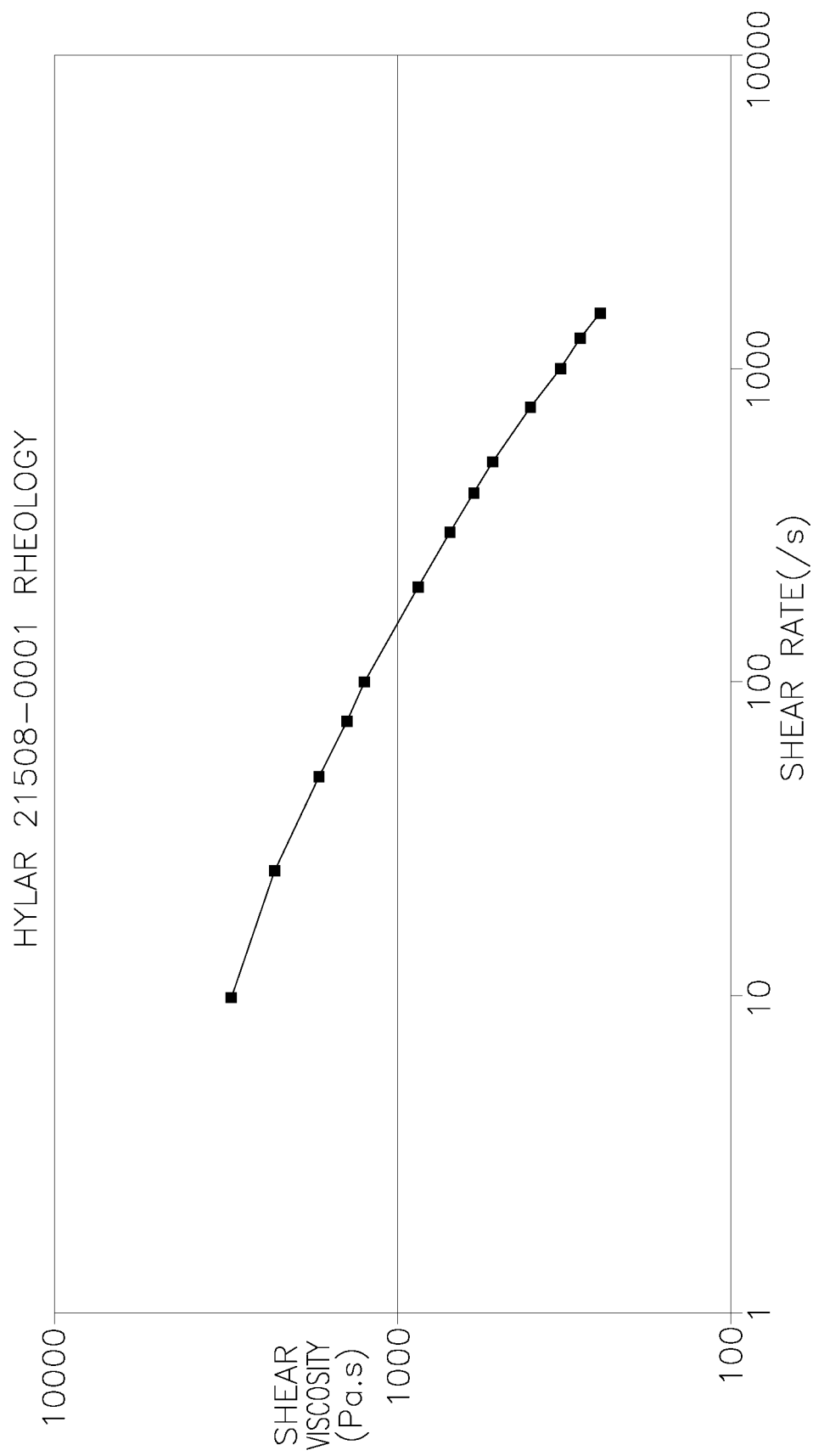
FIG. 6 is a graph illustrating shear viscosity vs. shear rate of a raw material used in manufacturing a RF weldable multilayer film according to an exemplary embodiment of the present invention.

The rheological data of the materials used is shown in FIGS. 5 & 6. Generally, materials with similar rheological profile are highly desirable as they may be more suitable for coextrusion. From the graph in FIG. 5, it appears that PVDF copolymer Kynar® Flex 2750-01 may be unsuitable for coextrusion with any of the tested TPU copolymers. The difference in its viscosity profile is considerable. A better alternative is to use Kynar® Flex 2750-13 as its viscosity profile is closer to the rheological profiles of EVOH copolymer and other TPU copolymers. In other words, the viscosity profile of Kynar® Flex 2750-13 indicates greater compatibility with the respective EVOH and TPU materials. Similarly, as shown in FIG. 6, Hylar® 21508-0001 also has a similar viscosity profile (not shown) to other EVOH and TPU copolymers and should be another good candidate for PVDF copolymer selection. Rheological data was obtained using a Rosland Dual Capillary Rheometer, Model RH7. Viscosity of each sample was determined at 200° C. over the typical extrusion profile shear rate range 100 s$^{-1}$ to 1500 s$^{-1}$. The data was Bagley corrected.

There does not seem to be any correlation between the material melt flow index (MFI) and the peel strength. However, as noted above, Kynar® Flex 2750-13 might perform better as it has similar viscosity profile with tested TPU copolymers. Indeed, in one embodiment (Test Sample #12) Kynar® Flex 2750-13 and BASF Elastollan® 685A10N seems to render better adhesion as it has the greatest peel strength of 2.32 N/mm.

These results seem to suggest that TPU copolymer selection, particularly TPU copolymers that comprise a polyester polyol, as shown in Table 3, test samples Nos. 9-12 and 17-18, is important in determining compatibility of different raw materials for multilayer coextrusion, as these samples have better adhesion results, and as a result do not require the use of an adhesive tie layer to bond certain PVDF copolymers.

Extruder Process Example

In the exemplary embodiment, the five-layer RF weldable film is manufactured by a cast die coextrusion process comprising three different extruders and the following process conditions. Table 4 shows the dimensions of the extruder screws used in the exemplary embodiment. Each extruder has three barrel zones for conveying, compressing and metering the feed. The feed zone is the area where the feed is propelled forward. The compression zone is where the root diameter of the screw gradually increases and where the pressure buildup, frictional heat, and melting occur. The metering zone is the area where the flow rate of the melt is controlled and fed into a die zone. The compression ratio (CR) is the ratio between the depth of flight in the feed zone to the depth of the flight in the metering zone.

TABLE 4

Extruder Screw Dimensions

| | | Length to Diameter Ratio (L/D) | | | | | |
|---|---|---|---|---|---|---|---|
| # | Screw Diameter (Diam) | Overall Length to Diam Ratio (L/D) | Flight depth in feed | Flight depth in metering | Length of feed zone (Barrel Zone 1) | Length of compression zone (Barrel Zone 2) | Length of metering zone (Barrel Zone 3) | Apparent CR |
| 1 | 38 mm | 30:1 | 6.17 | 2.08 | 9 | 11 | 10 | 3:1 |
| 2 | 38 mm | 30:1 | 6.05 | 1.98 | 9 | 11 | 10 | 3:1 |
| 3 | 38 mm | 24:1 | 4.48 | 1.43 | 8 | 8 | 8 | 3.1:1 |

Extruder no. 1 has a 38 mm screw diameter and an overall length to diameter ratio (L/D) of 30:1, where the length in the feed zone is 9 times the diameter. Similarly, in Cols. 7 and 8, Extruder no. 1, the numbers 11 and 10 denote the length in the compression zone is 11 times the screw diameter, and the length in the metering zone is 10 times that of the screw diameter.

As can be seen in Table 4, although extruder Nos. 1 and 2 have similar diameters and the overall length, the flight depth in feed and flight depth in metering are different. Similarly, although extruder No. 3 has a similar diameter as the others, its length dimensions are different. Typical examples of extruders Nos. 1 & 2 may be Killion KN150, 30:1 L/D single screw extruders, and No. 3 may be a Killion KTS 100, 24:1 L/D single screw extruder. The different extruder dimensions together with the coextrusion feed block design and different operating temperatures dictate how feed polymers are extruded through the cast die.

In the exemplary embodiment, the first and fifth layer of the RF weldable film comprises PVDF copolymer and is extruded through extruder No. 1 with three different barrel zones. The set temperatures of barrel zones Nos. 1-3 are at about 170° C. to about 210° C., about 180° C. to about 220° C., and about 190° C. to about 230° C., respectively. Preferably, set temperatures of barrel zones Nos. 1-3 are at about 175° C. to about 205° C., about 185° C. to about 210° C., and about 195° C. to about 225° C., respectively. Set temperatures of adapter and die zone are at about 190° C. to about 230° C., and preferably at about 190° C. to about 225° C.

The second and fourth layer of the RF weldable film comprises TPU copolymer and is extruded through extruder No. 2 with three different barrel zones. The set temperatures of barrel zones Nos. 1-3 are at about 160° C. to about 185° C., about 165° C. to about 190° C., and about 170° C. to about 195° C., respectively. Preferably, set temperatures of barrel zones Nos. 1-3 are at about 165° C. to about 180° C., about 170° C. to about 185° C., and about 175° C. to about 190° C., respectively. Set temperatures of adapter and die zone are at about 170° C. to about 205° C., and preferably at about 175° C. to about 200° C.

The third layer of the RF weldable film comprises EVOH copolymer and is extruded through extruder No. 3 with three different barrel zones. The set temperatures of barrel zones Nos. 1-3 are at about 175° C. to about 205° C., about 180° C. to about 215° C., and about 185° C. to about 220° C., respectively. Preferably, set temperatures of barrel zones Nos. 1-3 are at about 180° C. to about 200° C., about 185° C. to about 210° C., and about 190° C. to about 215° C., respectively. Set temperatures of adapter and die zone are at about 190° C. to about 230° C., and preferably at about 195° C. to about 225° C.

The materials met and passed though a five-layer co-extrusion block having a feed block geometry ratio of 3/3/1/3/3.

Although exemplary and preferred embodiments of the invention have been described in the Examples and foregoing detailed description, it will be understood that the invention is not limited to the embodiments disclosed, but is capable of numerous rearrangements, material substitutions, and modifications of parts and compositions without departing from the spirit of the invention as defined in the following claims. Therefore, the spirit and the scope of the appended claims should not be limited to the description of the preferred embodiments contained herein.

What is claimed is:

1. A method of manufacturing a multilayer film, the method comprising:
   laminating a first layer comprising a radio frequency (RF) active polyvinylidene fluoride (PVDF) copolymer directly onto a second layer comprising a polyester-based thermoplastic polyurethane (TPU) copolymer, and laminating a third layer comprising an ethylene vinyl acetate-vinyl alcohol (EVOH) copolymer as a gas barrier material on the second layer, the multilayer film being RF weldable and transparent having a haze no greater than 20% as measured according to an ASTM D1003 standard.

2. The method of manufacturing a multilayer film according to claim 1, further comprising laminating a first adhesive tie layer on the third layer, laminating a fourth layer on the first adhesive tie layer, laminating a second adhesive tie layer on the fourth layer, and laminating a fifth layer on the second adhesive tie layer.

3. The method of manufacturing a multilayer film according to claim 2, wherein the fourth layer comprises an EVOH copolymer, and the fifth layer comprises a PVDF copolymer.

4. The method of manufacturing a multilayer film according to claim 1, wherein the PVDF copolymer of the first layer comprises hexafluoropropylene (HFP).

5. The method of claim 1, wherein:
   the laminating the first layer directly onto the second layer comprises:
      feeding the second layer comprising the polyester-based thermoplastic polyurethane (TPU) copolymer into an extrusion laminator;
      simultaneously feeding the first layer comprising the radio frequency (RF) active polyvinylidene fluoride (PVDF) copolymer into the extrusion laminator on a first side of the second layer; and extruding the first layer directly onto the first side of the second layer to form a two-layer film with the first layer directly laminated on the first side of the second layer; and the laminating the third layer on the second layer comprises:
 re-feeding the two-layer film into the extrusion laminator;
 simultaneously with the two-layer film, feeding a first tie layer onto a second side of the second layer opposite the first side; and
 extruding the first tie layer on the two-layer film to form a three-layer film with the first tie layer on the second side of the second layer;
 re-feeding the three-layer film into the extrusion laminator;
 simultaneously with the three-layer film, feeding the third layer onto the first tie layer; and
 extruding the third layer on the first tie layer to form a four-layer film with the third layer on the first tie layer, the multilayer film being RF weldable.

6. The method of claim 1, wherein:
the laminating the first layer directly onto the second layer comprises:
 feeding the second layer comprising the polyester-based thermoplastic polyurethane (TPU) copolymer into an extrusion laminator;
 simultaneously feeding the first layer comprising the radio frequency (RF) active polyvinylidene fluoride (PVDF) copolymer into the extrusion laminator on a first side of the second layer; and
 extruding the first layer directly onto the first side of the second layer to form a two-layer film with the first layer directly laminated on the first side of the second layer; and
the laminating the third layer on the second layer comprises:
 re-feeding the two-layer film into the extrusion laminator;
 simultaneously with the two-layer film, feeding the third layer comprising the ethylene vinyl acetate-vinyl alcohol (EVOH) copolymer onto a second side of the second layer opposite the first side; and
 extruding the third layer on the two-layer film to form a three-layer film with the third layer on the second side of the second layer.

7. The method of manufacturing a multilayer film according to claim 6, wherein the PVDF copolymer of the first layer comprises hexafluoropropylene.

8. The method of manufacturing a multilayer film according to claim 6, the method further comprising:
 re-feeding the three-layer film into the extrusion laminator;
 simultaneously with the three-layer film, feeding a fourth layer onto a first side of the three-layer film;
 extruding the fourth layer to form a four-layer film with the fourth layer on the first side of the three-layer film;
 re-feeding the four-layer film into the extrusion laminator;
 simultaneously with the four-layer film, feeding a fifth layer onto the fourth layer of the four-layer film; and
 extruding the fifth layer on the fourth layer of the four-layer film to form a five-layer film with the fifth layer on the fourth layer.

9. The method of manufacturing a multilayer film according to claim 8, wherein the fourth layer comprises a TPU copolymer.

10. The method of manufacturing a multilayer film according to claim 9, wherein the fifth layer is directly laminated on the fourth layer, and the fifth layer comprises a PVDF copolymer.

11. The method of manufacturing a multilayer film according to claim 5, the method further comprising:
 re-feeding the four-layer film into the extrusion laminator;
 simultaneously with the four-layer film, feeding a second tie layer onto the third layer of the four-layer film;
 extruding the second tie layer to form a five-layer film with the second tie layer on the third layer;
 re-feeding the five-layer film into the extrusion laminator;
 simultaneously with the five-layer film, feeding a fourth layer onto the second tie layer;
 extruding the fourth layer on the second tie layer to form a six-layer film with the fourth layer on the second tie layer;
 re-feeding the six-layer film into the extrusion laminator;
 simultaneously with the six-layer film, feeding a fifth layer onto the fourth layer;
 extruding the fifth layer on the fourth layer to form a seven-layer film with the fifth layer on the fourth layer.

12. The method of manufacturing a multilayer film according to claim 11, wherein the fourth layer comprises a TPU copolymer.

13. The method of manufacturing a multilayer film according to claim 11, wherein the fifth layer comprises a PVDF copolymer.

14. The method of manufacturing a multilayer film according to claim 13, wherein the PVDF copolymer of the fifth layer comprises hexafluoropropylene (HFP).

15. A method of manufacturing a multilayer film, the method comprising:
 laminating a first layer consisting of a radio frequency (RF) active polyvinylidene fluoride (PVDF) copolymer directly onto a second layer consisting of a polyester-based thermoplastic polyurethane (TPU) copolymer, the multilayer film being RF weldable.

16. The method of manufacturing a multilayer film according to claim 15, further comprising laminating a third layer comprising a gas barrier material on the second layer.

17. The method of manufacturing a multilayer film according to claim 16, wherein the gas barrier material comprises an ethylene vinyl acetate-vinyl alcohol (EVOH) copolymer.

18. The method of manufacturing a multilayer film according to claim 16, further comprising laminating a first adhesive tie layer on the third layer, laminating a fourth layer on the first adhesive tie layer, laminating a second adhesive tie layer on the fourth layer, and laminating a fifth layer on the second adhesive tie layer.

19. The method of manufacturing a multilayer film according to claim 18, wherein the fourth layer comprises an EVOH copolymer, and the fifth layer comprises a PVDF copolymer.

20. The method of manufacturing a multilayer film according to claim 15, wherein the PVDF copolymer of the first layer comprises hexafluoropropylene (HFP).

* * * * *